US009937484B2

United States Patent
Liu et al.

(10) Patent No.: US 9,937,484 B2
(45) Date of Patent: Apr. 10, 2018

(54) REACTOR, $CO_2$ SORBENT SYSTEM, AND PROCESS OF MAKING $H_2$ WITH SIMULTANEOUS $CO_2$ SORPTION

(71) Applicant: Battelle Memorial Institute, Pacific Northwest National Laboratories, Richland, WA (US)

(72) Inventors: Wei Liu, Richland, WA (US); Xiaohong Shari Li, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 71 days.

(21) Appl. No.: 15/012,791

(22) Filed: Feb. 1, 2016

(65) Prior Publication Data

US 2016/0304344 A1 Oct. 20, 2016

Related U.S. Application Data

(60) Provisional application No. 62/109,840, filed on Jan. 30, 2015.

(51) Int. Cl.
   *B01J 7/00* (2006.01)
   *C01B 3/36* (2006.01)
   (Continued)

(52) U.S. Cl.
   CPC .............. *B01J 23/83* (2013.01); *B01J 8/0242* (2013.01); *B01J 19/2485* (2013.01);
   (Continued)

(58) Field of Classification Search
   CPC .......... B01J 19/2485; B01J 2208/00309; B01J 2219/2428; B01J 2219/243;
   (Continued)

(56) References Cited

U.S. PATENT DOCUMENTS 6,103,143 A * 8/2000 Sircar ...................... B01J 8/008
                                                   252/373
6,623,719 B2   9/2003 Lomax, Jr.
(Continued)

FOREIGN PATENT DOCUMENTS

CN    1903431 A    1/2007
CN    101829577 A    4/2010

OTHER PUBLICATIONS

Chattanathan, S.A. , Adhikari, S., and Abdoulmoumine, N., "A review on current status of hydrogen production from bio-oil", Renewable and Sustainable Energy Reviews 16 (2012) 2366-2372.
(Continued)

*Primary Examiner* — Imran Akram
(74) *Attorney, Agent, or Firm* — Frank Rosenberg; Derek Maughan

(57) ABSTRACT

A reactor and process for production of hydrogen gas from a carbon-containing fuel in a reaction that generates carbon dioxide is described. The carbon-containing fuel can be, for example, carbon monoxide, alcohols, oxygenates bio-oil, oil and hydrocarbons. In preferred embodiments, the reactor includes a monolithic structure form with an array of parallel flow channels. Methods of using the reactor are also described. In the reactor apparatus of the present invention, the catalytic reaction for hydrogen formation is conducted in conjunction with a carbonation reaction that removes carbon dioxide that is produced by the reactor. The carbonation reaction involves reaction of the carbon dioxide produced from the hydrogen formation reaction with metal oxide-based sorbents. The reactor apparatus can be periodically regenerated by regeneration of the sorbent. A carbon dioxide sorbent system comprising a solid sorbent and a eutectic, mixed alkali metal molten phase is also described.

**17 Claims, 25 Drawing Sheets
(24 of 25 Drawing Sheet(s) Filed in Color)**

(51) Int. Cl.

| | | |
|---|---|---|
| *B01J 23/83* | (2006.01) | |
| *C01B 3/56* | (2006.01) | |
| *B01J 20/04* | (2006.01) | |
| *C01B 3/38* | (2006.01) | |
| *B01J 19/24* | (2006.01) | |
| *B01J 8/02* | (2006.01) | |
| *B01J 37/06* | (2006.01) | |
| *B01J 37/08* | (2006.01) | |
| *B01J 21/06* | (2006.01) | |
| *B01J 23/00* | (2006.01) | |
| *B01J 23/755* | (2006.01) | |
| *B01J 35/00* | (2006.01) | |
| *B01J 35/04* | (2006.01) | |
| *B01J 35/10* | (2006.01) | |
| *B01J 37/02* | (2006.01) | |

(52) U.S. Cl.
CPC ........... *B01J 20/043* (2013.01); *B01J 21/063* (2013.01); *B01J 23/002* (2013.01); *B01J 23/755* (2013.01); *B01J 35/002* (2013.01); *B01J 35/04* (2013.01); *B01J 35/1014* (2013.01); *B01J 35/1019* (2013.01); *B01J 35/1038* (2013.01); *B01J 37/0201* (2013.01); *B01J 37/06* (2013.01); *B01J 37/08* (2013.01); *C01B 3/38* (2013.01); *C01B 3/56* (2013.01); *B01J 2208/00274* (2013.01); *B01J 2208/00309* (2013.01); *B01J 2208/025* (2013.01); *B01J 2219/243* (2013.01); *B01J 2219/2414* (2013.01); *B01J 2219/2428* (2013.01); *B01J 2219/2448* (2013.01); *B01J 2523/00* (2013.01); *C01B 2203/0233* (2013.01); *C01B 2203/0283* (2013.01); *C01B 2203/0425* (2013.01); *C01B 2203/0475* (2013.01); *C01B 2203/1023* (2013.01); *C01B 2203/1041* (2013.01); *C01B 2203/1058* (2013.01); *C01B 2203/1076* (2013.01); *C01B 2203/1247* (2013.01); *Y02P 20/145* (2015.11); *Y02P 20/52* (2015.11)

(58) Field of Classification Search
CPC ............ B01J 2219/2448; B01J 35/002; C01B 2203/0475; C01B 2203/1023; C01B 3/38; Y02P 20/52
See application file for complete search history.

(56) References Cited

U.S. PATENT DOCUMENTS

| | | | |
|---|---|---|---|
| 6,682,838 | B2 | 1/2004 | Stevens |
| 6,919,062 | B1 * | 7/2005 | Vasileiadis .......... C07C 29/1518 423/437.1 |
| 6,984,363 | B2 | 1/2006 | Tonkovich et al. |
| 2004/0103660 | A1 * | 6/2004 | Kawamura ........... F28F 13/003 60/599 |
| 2006/0090649 | A1 | 5/2006 | Liu et al. |
| 2008/0155984 | A1 | 7/2008 | Liu et al. |
| 2010/0284904 | A1 * | 11/2010 | Castaldi ................. B01D 53/02 423/652 |
| 2012/0138860 | A1 | 6/2012 | Seo |
| 2013/0017460 | A1 | 1/2013 | Keefer et al. |
| 2013/0034785 | A1 | 2/2013 | Duraiswamy et al. |
| 2013/0171404 | A1 | 7/2013 | Whillenberger |
| 2013/0287663 | A1 | 10/2013 | Zhang et al. |
| 2014/0134547 | A1 | 5/2014 | Tonkovich et al. |

OTHER PUBLICATIONS

Garcia, L., French, R., Szernik, S., and Chornet, E., "Catalytic steam reforming of bio-oils for the production of hydrogen: effects of catalyst composition", Applied Catalysis A: General 201 (2000) 225-239.

Radfarnia, H. R., Sayari, A., "A highly efficient CaO-based CO2 sorbent prepared by a citrate-assisted sol-gel technique" Chem. Eng. J. 262(2015)913-920.

Sanna, A., Ramli, I.I., Ilzyan Ili, Maroto-Valer, M.M., "Development of sodium/lithium/fly ash sorbents for high temperature post-combustion CO2 capture" Applied Energy 156(2015)197-206.

Sultana, K.S., Chen, D., "Enhanced hydrogen production by in situ CO2 removal on CaCeZrOx nanocrystals" Catalysis Today 171 (2011) 43-51.

Wu S.F. and Zhu Y.Q., "Behavior of CaTiO3/Nano-CaO as a CO2 Reactive Adsorbent", Ind. Eng. Chem. Res. 49 (2010) 2701-2706.

Xiao, G., Singh, R.,Chaffee, A., Webley, P., "Advanced adsorbents based on MgO and K2CO3 for capture of CO2 at elevated temperatures", International Journal of Greenhouse Gas Control 5 (2011) 634 639.

Liu, W., "Monolithic Piston-Type Reactor for Hydrogen Production through Rapid Swing of Reforming/Combustion Reactions", Pacific Northwest National Laboratory.

* cited by examiner

Steam reforming reforming

Auto-thermal

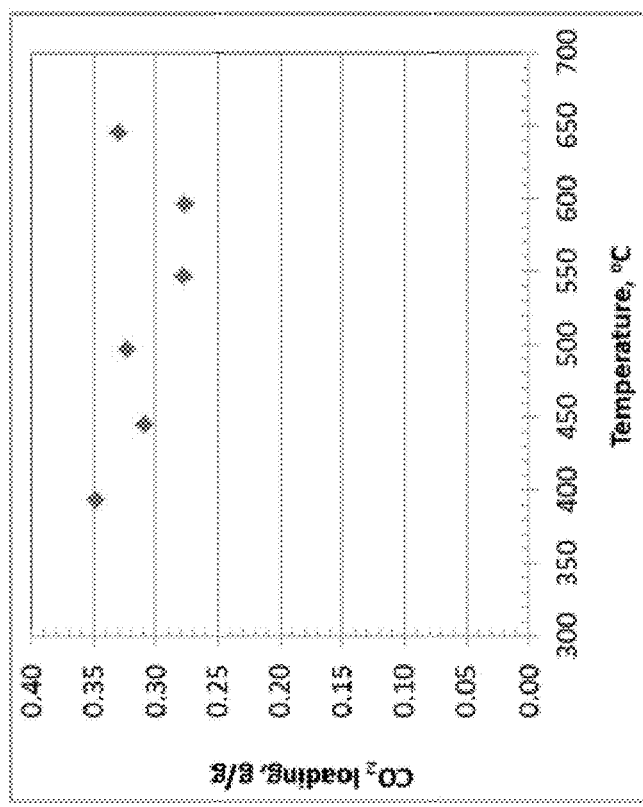
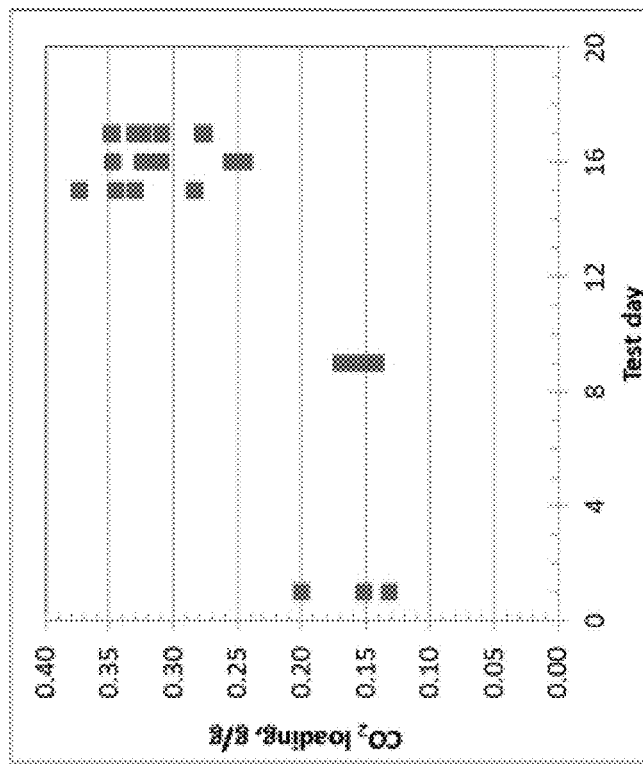
Fig. 16B
Fig. 16A

REACTOR, CO₂ SORBENT SYSTEM, AND PROCESS OF MAKING H₂ WITH SIMULTANEOUS CO₂ SORPTION

RELATED APPLICATIONS

This patent application claims the priority benefit of U.S. Patent Application Ser. No. 62/109,840.

INTRODUCTION

Distributed hydrogen production has been sought to address a range of applications where pipeline hydrogen is not available. For example, it is not feasible to build conventional large-scale H2 gas plants for distributed and/or on-demand power generation using, e.g., H2 fuel cells, various H2-needed hydrogenation and/or hydrotreating processes, etc.

Hydrogen production typically involves steam-reforming, water-gas-shift reactions, and gas purification steps. However, the reforming reaction is an energy-intensive process step because it is an endothermic reaction and involves a large capital cost. In addition, process flow diagrams involving these conversion steps are too complicated to economically build a small-scale H2 plant, because economy of scale problems exist with conventional unit operation approaches. Another problem is that catalysts often deactivate rapidly due to use of biomass-derived fuel sources. For example, in the literature, catalysts used for steam-reforming of bio-oils can deactivate within a few hours.

Renewable hydrocarbon resources such as alcohols and bio-oil are attractive fuels for hydrogen production. Bio-oil can be derived from various biomass raw materials. However, unique challenges remain to be addressed for production of hydrogen from bio-oil compared to conventional hydrocarbon steam reforming processes. For example, bio-oil contains large amounts of water and oxygen, and exhibits a relatively low heat of combustion. Thus, bio-oil is suitable for steam reforming reactions that require much less stoichiometric amounts of oxygen (from either steam or oxygen gas) than pure hydrocarbons. A significant fraction of the bio-oil is non-volatile.

Various catalysts containing transition metals and precious metals, testing conditions, and various feedstocks have been reviewed in the literature by Chattanathan et al. and studied with model compounds and actual bio-oil.

TABLE 1

Literature Review of Catalysts for $H_2$ Production.*

| Catalyst | Conditions | Feed |
|---|---|---|
| Ni—Al promoted with La | fluidized bed: T = 450-700° C.; S/C = 5.58; Liquid feeding rate = 1.84-2.94 g/min | Model compound: acetic acid |
| Commercial catalyst Z417 | bench-scale fixed bed: 500-700° C. | Aqueous fraction of bio-oil |
| Ni based catalyst | fixed bed: 600-900° C.; H2O/C = 2-8.2; $GC_1$ HSV = 300-500 $h^{-1}$ | Acetic acid, acetone, ethylene and aqueous phase of bio-oil |
| Ru/MgO/$Al_2O_3$ | Nozzle fed reactor: 800° C.; S/C = 7.2 | Acetic acid and aqueous bio-oil |
| 2CaO—7$Al_2O_3$, 12% Ni/$Al_2O_3$, 1% Pt/$Al_2O_3$ | fixed-bed flow reactor: 750° C.; S/C = 6.0 GHSV = 26,000 $h^{-1}$ | Volatile organic components of crude bio-oil |
| Ni/$CeO_2$—$ZrO_2$; Ni-12% Ce-7.5% | fixed bed: 450-800° C.; water/bio-oil = 4.9 | Aqueous fraction of bio-oil |
| Ni, Rh or Ir/$CaAl_2O_4$ | fixed bed quartz reactor: 550-750° C.; S/C = 3, Space velocity = 30,000 $h^{-1}$ | Acetic acid and acetone |
| Ni—Al modified with Mg and Ca | fluidized bed: 650° C.; $GC_1$HSV = 11,800 $h^{-1}$ | Aqueous fraction |
| Commercial catalyst C11-NK and NREL#20 | bench-scale fluidized bed: 850° C.; S/C = 5.8; Space velocity = 920 $h^{-1}$ | Whole bio-oil |
| 2CaO—7$Al_2O_3$ doped with Mg, K or Ce | fixed bed micro-reactor: 200-750° C.;/C = 1.5-9; GSHV = 10,000 h−1 | Whole bio-oil |
| Non-catalytic | Tubular reactor: 625-850° C.; oxygen/carbon ratio = 1.4-1.6 | Whole bio-oil |

*[S. A. Chattanathan, S. Adhikari, N. Abdoulmoumine. "A review on current status of hydrogen production from bio-oil" Renewable and Sustainable Energy Reviews 16 (2012) 2366-2372].

Some literature reports on Bio-oil reforming at low temperatures have been published. Some catalyst materials have been compared to Ni/alumina, a common reforming catalyst system. Newer catalyst materials show an ability to conduct the bio-oil reforming reaction at a much lower temperature compared to steam reforming of methane. However, stability of these newer catalysts has not been reported. Further, reported steam/oil ratios in the literature are yet too high for practical application.

TABLE 2

Recent literature reports on steam reforming of bio-oils.

| Ref | Catalyst | Conditions | Result |
|---|---|---|---|
| 2 | Ni (+additive)/ $Al_2O_3$ | 825-875° C., GHSV up to 126,000 $h^{-1}$ | Quick catalyst deactivation led to a decrease in the yields of hydrogen and carbon dioxide and an increase in carbon monoxide. |

TABLE 2-continued

Recent literature reports on steam reforming of bio-oils.

| Ref | Catalyst | Conditions | Result |
|---|---|---|---|
| 3 | 20 wt % Ni/HZSM-5(Si/Al = 25) | 450° C., very high steam/carbon ratio | 90% $H_2$ yield obtained with nearly complete conversion of bio-oil |
| 4 | NiCu/MgCe/Al mixed oxides | bio-oil reforming at 250-500° C. | High water gas shift activity |
| 5 | Ni/CNFs catalyst | 350-550° C.; GHSV = 10000 $h^{-1}$ | Uniform Ni distribution exhibited a much higher activity than the usual Ni/$Al_2O_3$ catalyst |

Reaction temperatures used in the literature are typically above 500° C. Catalyst deactivation is a prominent problem reported in most references. And, long-term catalyst stability has not been achieved or reported in the literature, which is attributed to coke formation as a major cause.

Another feature of the present invention involves $CO_2$ sorbent systems. Capturing CO2 at temperatures of 200 to 700° C. is useful to both existing process improvements and future CO2 emission control. Removing CO2 under reaction conditions can shift the reaction equilibrium toward completion[1-7], such as steam reforming and water-gas-shift reaction processes that are widely used for syngas and hydrogen production in today's industries. Hot flue gas CO2 capture for CO2 sequestration purposes is viewed beneficial to efficient thermal energy utilization.[8-10] CO2 sorbents and sorption processes have become a very active research field for a recent decade. The materials studied so far are grouped into three categories: CaO-based,[8-19] MgO-based,[20-26] metal oxide compounds[27-31] (such as lithium silicate and dolomite). The MgO-based sorbent works at moderate temperatures (200-400° C.), while the CaO-based works at relatively high temperatures (600-800° C.). Sorption of CO2 on these sorbents is a gas/solid reaction process. One problem with this approach is degradation or de-activation of the sorbent in the presence of steam and over repeated sorption/regeneration cycles. Long-time cyclic stability is necessary to reduce the material consumption and costs for practical applications. For example, about 24,000 sorption/regeneration cycles in 20-min cycling time are need in order for a sorbent to have 8000-h service time. Another problem is about CO2 sorption and sorbent regeneration rates. The slow kinetics of existing sorbent materials requires a large reactor vessel.

Significant efforts are made by the research community toward enhancing the sorbent stability and kinetics. CaO-based sorbents are the most extensively studied one, because of in-expensive and abundant resources. The sorbent performances are improved by dispersing CaO grains into or onto more durable ceramic matrices[15-17], coating the CaO grains with more stable ceramic nano-particles[18] such as $ZrO_2$, or making CaO into hollow spheres.[19]

REFERENCES

1. L. Garcia, R. French, S. Czernik, E. Chornet. "Catalytic steam reforming of bio-oils for the production of hydrogen: effects of catalyst composition" *Applied Catalysis A*: General 201 (2000) 225-239.
2. K. S. Sultana, D. Chen. "Enhanced hydrogen production by in situ $CO_2$ removal on CaCeZrOx nanocrystals" *Catalysis Today* 171 (2011) 43-51.
3. M. H. Halabi, M. H. J. M. de Croon, J. van der Schaaf, P. D. Cobden, J. C. Schouten. "Kinetic and structural requirements for a $CO_2$ adsorbent in sorption enhanced catalytic reforming of methane—Part I: Reaction kinetics and sorbent capacity" *Fuel* 99 (2012) 154-164.
4. N. Chanburanasiri, A. M. Ribeiro, A. E. Rodrigues, N. Laosiripojana, and S. Assabumrungrat. "Simulation of Methane Steam Reforming Enhanced by in Situ $CO_2$ Sorption Using $K_2CO_3$-Promoted Hydrotalcites for $H_2$ Production" *Energy Fuels* 27 (2013) 4457-4470.
5. Remiro, B. Valle, B. Aramburu, A. T. Aguayo, J. Bilbao, and A. G. Gayubo. "Steam Reforming of the Bio-Oil Aqueous Fraction in a Fluidized Bed Reactor with in Situ $CO_2$ Capture" *Ind. Eng. Chem. Res.* 52 (2013)17087-17098.
6. Vanessa. Lebarbiar, et. al, "Sorption-enhanced synthetic natural gas production from syngas", Applied Catalysis B, 144, 223-232.
7. Radfarnia, H R "Hydrogen production by sorption-enhanced steam methane reforming process using CaO—Zr/Ni bifunctional sorbent-catalyst" Chem. Eng. And Proc. 86 (2014)96-103.
8. L. Li, D. L. King, Z. Nie, X. Li, and C. Howard "$MgAl_2O_4$ Spinel-Stabilized Calcium Oxide Absorbents with Improved Durability for High-Temperature $CO_2$ Capture" Energy & Fuel, 24 (2010) 3698-3703.
9. L. Li, D. L. King, Z. Nie, and C. Howard "Magnesia-Stabilized Calcium Oxide Absorbents with Improved Durability for High Temperature $CO_2$ Capture" *Ind. Eng. Chem. Res.* 48 (2009)10604-10613.
10. Zhang, L "The Role of Water on the Performance of Calcium Oxide-Based Sorbents for Carbon Dioxide Capture: A Review" Energy tech 3 (2015)10-19.
11. S. F. Wu, Y. Q. Zhu "Behavior of $CaTiO_3$/Nano-CaO as a $CO_2$ Reactive Adsorbent" *Ind. Eng. Chem. Res.* 49 (2010) 2701-2706.
12. V. S. Derevschikov, A. Lysikov, A. Okunev. "Sorption properties of lithium carbonate doped CaO and its performance in sorption enhanced methane reforming" *Chem. Eng Sci.* 66 (2011)3030-3038.
13. Radfarnia, H R; Sayari, A "A highly efficient CaO-based CO2 sorbent prepared by a citrate-assisted sol-gel technique" Chem. Eng. J. 262 (2015)913-920.
14. Lee, Z H; Ichikawa, S; Lee, K T; Mohamed, A R "The role of nickel oxide additive in lowering the carbon dioxide sorption temperature of CaO" *J. of Energy Chem.* 24 (2015)225-231.
15. Lee, M S; Goswami, D Y; Kothurkar, N; Stefanakos, E K. "Development and evaluation of calcium oxide absorbent immobilized on fibrous ceramic fabrics for high temperature carbon dioxide capture" Powder Technology 274 (2015)313-318.
16. Tian, S C; Jiang, J G; Yan, F; Li, K M; Chen, X I "Synthesis of Highly Efficient CaO-Based, Self-Stabilizing CO2 Sorbents via Structure-Reforming of Steel Slag" Environmental Science & Technology 49 (2015)7464-7472.
17. Peng, W W; Xu, Z W; Luo, C; Zhao, H B. "Tailor-Made Core-Shell CaO/TiO2-Al2O3 Architecture as a High-Capacity and Long-Life CO2 Sorbent" Environmental Science & Technology 49 (2015)8237-8245.
18. Sultana, K S; Tran, D T; Walmsley, J C; Ronning, M; Chen, D. "CaO Nanoparticles Coated by ZrO2 Layers for Enhanced CO2 Capture Stability" Industrial & Engineering Chemistry Research 54 (2015)8929-8939.
19. Ping, H L, Wu, S F "Preparation of cage-like nano-CaCO3 hollow spheres for enhanced CO2 sorption" RSC ADVANCES 5 (2015)65052-65057.

20. G. Xiao, R. Singh, A. Chaffee, P. Webley "Advanced adsorbents based on MgO and $K_2CO_3$ for capture of $CO_2$ at elevated temperatures" *International Journal of Greenhouse Gas Control* 5 (2011) 634-639.
21. M. Liu, C. Vogt, A. L. Chaffee, and S. L. Y. Chang "Nanoscale Structural Investigation of $Cs_2CO_3$-doped MgO Sorbent for $CO_2$ Capture at Moderate Temperature" J. Phys. Chem. C 117 (2013)17514-17520.
22. K. Kim, J. W. Han, K. S. Lee, W. B. Lee. "Promoting alkali and alkaline-earth metals on MgO for enhancing $CO_2$ capture by first-principles calculations" Phys, chem. Chem. phys: PCCP, 16 (45) (2014) 24818-23.
23. A. T. Vu, Y. Park, P. R. Jeon, C. H. Lee. "Mesoporous MgO sorbent promoted with $KNO_3$ for $CO_2$ capture at intermediate" *Chem. Eng. J.* 258 (2014) 254-264.
24. C. H. Lee, S. Mun, K. B. Lee. "Characteristics of Na—Mg double salt for high-temperature $CO_2$ sorption" Chem. Eng. J. 258 (2014)367-373.
25. K. Zhang, X. Li, W. Li, A. Rohatgi, Y. Duan, P. Singh, L. Li and D. L. King "Phase transfer-catalyzed fast CO2 absorption by MgO-based absorbents with high cycling capacity", Advanced Material Interface 2014, 1400030.
26. K. Zhang, X. Li, W. Li, Y. Duan, D. L. King, and L. Li "Roles of double salt formation and $NaNO_3$ in $Na_2CO_3$-promoted MgO absorbent for intermediate temperature $CO_2$ removal". Int. J. of Greenh. Gas Con. 12, 351-358 (2013).
27. I. C. Romero-Ibarra, F. Duran-Munoz, H. Pfeiffer. "Influence of the K-, Na- and K—Na-carbonate additions during the $CO_2$ chemisorption on lithium oxosilicate ($Li_8SiO_6$)" *Greenhouse Gases-Science and Technology* 4 (1) (2014)145-154.
28. P. V. Subha, Balagopal N. Nair, P. Hareesh, A. Peer Mohamed, T. Yamaguchi, K. G. K. Warriera, and U. S. Hareesh. "Enhanced $CO_2$ absorption kinetics in lithium silicate platelets synthesized by a sol-gel approach" *J. Mater. Chem. A* 2 (2014)12792-12798.
29. Zhang, 5; Zhang, Q; Shen, C; Ni, Y H; Wu, Y Q; Wu, Q F; Zhu, Z B "Self-Activation Mechanism Investigations on Large $K_2CO_3$-Doped Li4SiO4 Sorbent Particles" Industrial & Engineering Chemistry Research 54 (2015) 7292-7300.
30. Sanna, A; Ramli, I; Maroto-Valer, M M. "Development of sodium/lithium/fly ash sorbents for high temperature post-combustion $CO_2$ capture" Applied Energy 156 (2015)197-206.
31. Zarghami, 5; Ghadirian, E; Arastoopour, H; Abbasian, J. "Effect of Steam on Partial Decomposition of Dolomite" Industrial & Engineering Chemistry Research 54 (2015) 5398-5406.
32. Y. Wu, N. Ren, T. Wang, C. Ma "Experimental study on optimized composition of mixed carbonate salt for sensible heat storage in solar thermal power plant" Solar Energy 85 (2011)1957-1966.
33. R. I. Olivares, C. Chen, and S. Wright "The Thermal Stability of Molten Lithium-Sodium-Potassium Carbonate and the Influence of Additives on the Melting Point" J. of Solar Energy Eng. 134 (2012)041002-10.

Many publications have reported various $CO_2$ sorbents used for $CO_2$ capture and sequestration. A shortened list of $CO_2$ sorbents that might work under bio-oil steam reforming conditions published during the most recent five years is summarized in TABLE 3. Several articles have reported integrating in-situ $CO_2$ capture with steam reforming of methane. Others have dealt with bio-oil steam reforming reactions with in-situ $CO_2$ capture.

TABLE 3

Literature reports on $CO_2$ sorption related to present work.

| Ref | Sorbent/catalyst | Reaction conditions | Finding |
|---|---|---|---|
| 6 | 26 wt % MgO in CaO—MgO | Adsorption and purge gas at 758° C. | 53 wt % $CO_2$ capacity shown after 50 cycles. Without MgO, the capacity decreased from 66 to 26 wt %. |
| 7 | 10 wt % $TiO_2$ in $TiO_2$—CaO | Carbonation: $P_{CO2}$ = 0.2 bar, 600° C.; calcination: 750° C. | An optimum sorbent showed stable $CO_2$ sorption capacity (5.3 mol/kg) after 40 cycles |
| 8 | $K_2CO_3$—MgO | Sorption: 300-400° C.; $P_{CO2}$ = 1.0 | Excellent cycling stability in both temperature and pressure swing operation |
| 9 | CeZrO$x$—CaO (1:1:10)/40 wt. % Ni hydrotalcite | $CH_4$ steam reforming reaction: 570° C., $H_2O/CH_4$ = 3; regeneration: 700° C., 1 h | Significantly improved $CO_2$ capture capacity and cyclic reaction stability compared to natural dolomites. |
| 10 | $Li_2CO_3$—CaO | $CH_4$ steam reforming reaction: 750° C., $H_2O/CH_4$ = 4, P = 2 bar | The $CO_2$ sorption capacity decreased with carbonation-regeneration cycles |
| 11 | $Mg_{1-x}Al_x(OH)_2(CO_3)_x$, Lithium zirconate/ Rh—$Ce_aZr_{1-a}O_2$ | $CH_4$ steam reforming reaction: 475-575° C., 150 kPa | The hydrotalcite exhibited weak and reversible physic-sorption with 10-17 kJ/mol; lithium zirconate had slow kinetics at 600° C.; the regeneration up to 900° C. |
| 12 | $Cs_2CO_3$-doped MgO | Sorption temperature: 300° C. | $CO_2$ sorption capacity increased from 250 to 300° C. |
| 13 | commercial $K_2CO_3$-promoted HTC from SASOL | Methane steam reforming: 590° C. at low S/C ratio, 500° C. at higher S/C ratio | Regeneration done by water vapor/He gas purge |

TABLE 3-continued

Literature reports on $CO_2$ sorption related to present work.

| Ref | Sorbent/catalyst | Reaction conditions | Finding |
|---|---|---|---|
| 14 | Dolomite/ Ni/$La_2O_3$-$\alpha$-$Al_2O_3$ | Bio-oil steam reforming: 550-650° C.; space time = 0.45-1.35 $g_{cat}$ $(g_{oil}/h)^{-1}$; steam/carbon ratio = 10 | Dolomite calcined at 800° C. for 2 h in order to obtain the active phase (CaO). |
| 15 | $KNO_3$—MgO | Sorption: 325-375° C.; regeneration: 450° C. | MgO/$KNO_3$ was highly stable at 375° C. |
| 16 | $Na_2Mg(CO_3)_2$ | Sorption: 375° C. | Fast sorption and desorption |
| 17 | Alkaline and alkaline earth-promoted MgO | Modeling of $CO_2$ sorption | The adsorption energy on the metal-promoted MgO sorbents is higher, except for Na. |
| 18 | $Li_8SiO_6$ mixed with K—, Na— and K—Na-carbonates | Sorption: 400-600° C.; Desorption: 800° C. in $N_2$ | Sorption capacity increased with temperature |
| 19 | Lithium silicate | Desorption: 750° C. in $N_2$ | Both sorption capacity and kinetics increase with temperature up to 700° C. |

Steam reforming of methane with in situ $CO_2$ capture on a CeZrO$_x$—CaO sorbent produced >95% pure $H_2$. CaCeZrO$_x$ (10:1:1) appears to be a promising sorbent but requires a regeneration temperature of 700° C.

$Li_2CO_3$—CaO sorbent enhances yield from methane reforming and produces pure hydrogen during a first cycle as high as 99.8 vol %. However, capacity decreases with carbonation-regeneration cycles because the Li dopant escapes from the sorbent and the aged sorbent behaves like CaO, which is known to be unstable during the regeneration cycle.

The working temperature for CaO-based sorbents is also above 700° C., which is too high for most practical applications. Reaction conditions and reactor bed structures reported in the literature are also different from those described herein. Furthermore, a stable $CO_2$ sorbent has not yet been demonstrated in a sorption/regeneration cycle.

The present invention presents the material, bed structure, and reactor innovations that provide advantages over systems described in the prior literature.

SUMMARY OF THE INVENTION

In a first aspect, the invention provides a reactor for producing hydrogen, comprising: a reaction channel comprising a steam reforming catalyst or water gas shift catalyst, the reaction channel comprising one or more channel walls; wherein at least one reaction channel wall is porous to carbon dioxide; a sorbent chamber adjacent the reaction channel, separated from the reaction channel by one or more channel walls; and comprising a $CO_2$ sorbent; and wherein the reaction channel comprising the steam reforming catalyst has an average diameter of between 0.1 mm and 10 mm.

The invention, in any of its aspects, can be characterized by one or more of the following: wherein the reaction channel comprising the steam reforming catalyst has an average diameter of 10 mm or less, or between 0.1 mm and 10 mm; preferably 0.5 mm and 5 mm; and wherein the reactor comprises a plurality of parallel reaction channels; preferably at least 10; more preferably at least 100; wherein the catalyst is a steam reforming catalyst and wherein the steam reforming catalyst is a wall coating and wherein an open bulk flow path is present in reaction channel; wherein the steam reforming catalyst comprises Ni, Cu, Mg, Ce, and Al; wherein the reactor comprises a honeycomb monolith; wherein the reactor comprises a plurality of parallel reaction channels alternating with plurality of parallel sorbent chambers; preferably at least 10 parallel reaction channels alternating with at least 10 parallel sorbent chambers; wherein sorbent fills a cross-section of the sorbent chamber; wherein the reactor channel or channels each have an inlet and an outlet; and wherein the sorbent chamber or sorbent chambers having no ports or closed ports such that gaseous flow into and out of sorbent chamber is only through the porous reaction channel wall(s); wherein the cross-section of the reaction channel (and/or sorbent chamber), in the direction orthogonal to flow through reaction channel, is square, rectangular, or circular; wherein the reactor comprises a honeycomb monolith; and wherein the monolith comprises: a macro- and meso-porous material (macroporous refers to pores in the range of 50 nm-100 μm; mesoporous 2 to 50 nm); a metal oxide; titania, alumina, silica; or a dense material such as metal with apertures for gas flow; wherein the sorbent surrounds the reaction channel; wherein a single sorbent chamber surrounds plurality of (preferably parallel) reaction channels; wherein the porous channel wall has a volume average pore size that in the range of about 1 nm to 100 μm, in some embodiments about 2 nm to 1000 nm. The sorbent in the reactor can be any of the sorbent compositions described herein. In some preferred embodiments, the reaction channel wall is not a membrane or a sorbent (in some preferred embodiments the reaction channel wall is inert) but is porous to all gases; this configuration provides for faster operation and greater stability.

The invention includes methods of steam reforming, comprising passing a hydrocarbon and steam into any of the reactors described herein.

In another aspect, the invention provides a $CO_2$ sorbent system is a composite material comprising: Mg-based phase (MgO, Mg(OH)2, $MgCO_3$, or mixture thereof), Ca-based phase (CaO, Ca(OH)$_2$, $CaCO_3$, or mixture thereof), and a promoter phase comprising a mixed alkali metal carbonate having at least 2 alkali atoms selected from the group consisting of Li, Na, and K; and wherein the atomic ratio of Mg:Ca is in range of 0.3 to 3.3; preferably 0.5 to 2.

Preferably, the carbonate is stable to 800° C. Preferably, the sorbent system comprises 3 essential phases: structural stabilizer; active metal oxide phase; and promoter. Following the techniques described herein, the sorbent system can be characterized by elemental analysis, x-ray diffraction (XRD) analysis and scanning electron microscopy (SEM) analysis. Preferably, the alkali in the promoter phase comprises at most 80 atom % of any one of the 3 elements, and in some preferred embodiments, includes at least 10 atom % of each of the three alkali elements Li, Na, and K.

In some preferred embodiments, the sorbent can be further characterized by one or any combination of the following characteristics: wherein the promoter is preferentially dispersed in the composite uniformly and is substantially free of distinctive crystallites or segregated particles; wherein the sorbent comprises 2-30 wt % or 5-20 wt % or about 5-10 wt % of the promoter; comprising essentially no nitrate, or less than 0.5 wt % N, 0.3, 0.2, 0.1% N; or wherein the $CO_2$ sorbent system consists essentially of MgO or CaO and a promoter comprising a mixed-metal alkali metal carbonate having at least 2 alkali atoms selected from the group consisting of Li, Na, and K; wherein the promoter comprises Li, Na, and K, in an atomic ratio of 1-5 Li:1-5 Na: and 1-5 K; wherein the sorbent system is at a sorption temperature of from 300 to 450° C. and a regeneration temperature from 300 to 500° C.; the sorbent system is at a sorption temperature of from 350 to 700° C. and a regeneration temperature from 650 to 800° C.; wherein the sorbent comprises a porous, solid matrix and a liquid phase (molten carbonate comprising at least 2 of Li, Na, K); comprising dolomite (CaMg—CO3) as the Mg and Ca-phases (the dolomite may or may not be pre-calcined); comprising an inert solid support phase, an active solid working phase, and a liquid-phase promoter; wherein the Mg-based phase and Ca-based phases are identifiable by X-ray diffraction (XRD) measurements, and the promoter phase is not be identifiable by XRD or its XRD peaks are substantially smaller than the Mg and Ca-based phases if its crystalline phase is detectable; wherein the promoter is molten and the sorbent system is at a temperature below the melting temperature of pure Na or K carbonate.

In a further aspect, the invention provides a method of converting hydrocarbons to H2, comprising: passing a carbon fuel and water into the reactor; wherein the water is in the form of steam or wherein the water is converted to steam within the reactor; wherein the reaction channel is at a temperature of at least 350° C.; wherein the steam and carbon fuel react in the reaction channel at a temperature of at least 350° C. to produce at least $H_2$ and $CO_2$; wherein at least a portion of the $CO_2$ flows into the sorbent chamber where it is sorbed by the $CO_2$ sorbent; and regenerating the $CO_2$ sorbent. The removal of $CO_2$ has the net effect of driving the equilibrium of the water gas shift reaction toward the synthesis of additional $H_2$.

In some preferred embodiments, the method can be further characterized by one or any combination of the following characteristics: wherein the carbon fuel is a hydrocarbon and wherein the reactor comprises a steam reforming catalyst; wherein sorption of $CO_2$ in the sorption chamber generates heat that passes through the reaction chamber wall and adds heat to a steam reforming reaction that occurs in the reaction channel; wherein the $CO_2$ sorbent is regenerated by increasing the bed temperature and/or reducing partial pressure of $CO_2$; wherein the reactor is taken off line (the flow of hydrocarbon is discontinued) while the $CO_2$ sorbent is regenerated; wherein H2 produced in the reaction channel passes out through an outlet; wherein the reforming and sorption are performed at a temperature less than or equal to about 700° C. in a time of less than about 10 minutes; wherein the reforming and sorption are performed iteratively in a plurality of cycles with a delay between any subsequent cycle of less than or equal to about 10 minutes; wherein regenerating the reforming catalyst and the CO2 capture sorbent with an oxygen-containing gas is conducted at a temperature less than or equal to about 700° C. (or 750 C) in a time of less than or equal to about 10 minutes; wherein the steam reforming catalyst is a Ni-oxide based catalyst comprising cerium oxide, titanium dioxide, a zeolite, alumina, or combinations thereof; wherein the CO2 sorbent has any of the characteristics described herein; wherein at least 30% or at least 50% of the heat required for the steam reforming reaction is provided by the CO2 sorption; wherein the steam-reforming reaction is performed in the catalyst bed absent a downstream partial oxidation (POX) step or a downstream auto-thermal reforming (ATR) step; and/or wherein the hydrocarbon feedstock is a bio-oil.

The invention can also be characterized by any of the features or data provided in the descriptions or examples. For example, the sorbent could be characterized by the cycling test methods described in the examples while maintaining sorption capacity as shown in the examples. An example would be: wherein the CO2 sorbent is subjected to at least 8 regeneration cycles and the CO2 sorbent loses less than 5% of its sorption capacity; or wherein the CO2 sorbent is subjected to at least 8 regeneration cycles and the CO2 sorbent gains at least 5% of its sorption capacity. Furthermore, any aspect of the invention can, in some embodiments, be characterizable by any of the data from the examples ±10% or ±20%; either as a process characteristic or as a physical property when measured under the conditions described in the examples.

Various embodiments of the invention can provide significant advantages. One innovative feature made possible by the inventive system is process equipment elimination and/or minimization compared to conventional hydrogen production. Bio-oil steam reforming (SR) is a highly endothermic reaction requiring significant amounts of heat. Heating the reactor tube in a furnace for SR or using partial oxidation (POX) or auto-thermal reforming (ATR) are the conventional ways to supply the reaction heat. SR requires a large high-temperature furnace, while POX and ATR need an air separation unit to supply oxygen. Both methods add complexity and cost. The inventive approach can utilize in-situ heating of the catalyst bed by alternating reforming (endothermic) and regeneration (exothermic) reactions, and by coupling of the endothermic reforming with exothermic carbonation reaction. This can eliminate an external combustor for SR or oxygen separator for POX/ATR. Produced CO2 is captured in-situ with a solid sorbent that is integrated with the SR catalyst into one reactor.

Another innovative feature is minimization of process steps. In situ CO2 capture shifts thermodynamic equilibrium of SR reactions toward higher one-pass conversion to H2. Thus, a separate water-gas-shift (WGS) process step is avoided. And size of the gas purification unit such as pressure swing adsorption (PSA) can be reduced. The literature reactors typically operate at high temperatures (570-800° C.) presenting a challenging environment for sorbent stability. The invention can, in preferred embodiments, lower the reaction and $CO_2$ capture temperatures to moderate regimes (<700° C.) using new reforming catalysts and $CO_2$ sorbents.

Another innovative feature is to reduce catalyst deactivation, which is known as a major problem for reforming of bio-oils. Coverage of the catalyst pores by stagnant bio-oil liquids results in physical deactivation, while chemical deactivation is mostly due to coking of active sites. The physical deactivation can be mitigated by atomizing the bio-oil into small (<channel size) droplets using steam and/or by providing a smooth catalyst external surface to minimize accumulation of dead liquid pockets. The smooth surface of catalyst-coated monolith channel walls would enable uniform spread and contact of un-vaporized liquid droplets with the catalyst. The chemical deactivation is due to nature of catalysis chemistry. Bio-oils are comprised of some oxygenates that are potent catalyst coking agents. The deactivated catalyst is regenerated by burning off the coke. In the present invention, rapid swing reactor operation allows for catalyst deactivation by enabling frequent in-situ regeneration. As a result, the reforming reaction can be run at high space velocity and moderate temperatures on a highly active catalyst that deactivates. The swing reactor operation enables utilization of highly active catalysts that would not be possible in conventional steady-state reforming operations.

Various preferred embodiments of the present invention may differ from the prior art in several respects:

Different reaction conditions. Particularly, the reaction temperature for the present invention is lower than the most methane reforming and bio-oil reforming reactions reported in the literature. In addition to the temperature, the reactor will be operated by rapid swing between the reaction/sorption and regeneration in the order of minutes.

Different $CO_2$ sorbent and reforming catalyst materials. The $CO_2$ sorbent will be a composite of MgO-based solids and CaO-based solids mixed at micrometer or nano-meter scales, and promoted by molten carbonates (KLiNa—$CO_3$). The catalyst material will be transition metal oxide-alkaline earth/rare earth metal oxide composites such as NiCu—MgCe, and the metal oxide composite combined with acidic catalysts (gamma-alumina, Y, ZSM-5). The catalyst provides redox catalytic activity and hydrocracking activity. The catalyst is in an active state after air calcination.

Different reactor bed structures. In this invention, the sorbent and catalyst inside the reactor can be made in a monolithic structure form, as compared to conventional particles and/or extrudate.

Although various structures have been proposed in the prior art with regard to microchannel apparatus, the inventive systems are characterized by having a number of reaction channels being housed inside a conventional reactor vessel or tube (reactor diameter>10 mm) and generating synergistic effects made possible by the paring of $CO_2$ sorbent with an endothermic $H_2$ forming reaction.

Glossary

A "porous" sorbent has porosity that aids in providing a high surface area; the porosity is not necessarily through-porosity but is the well-known porosity in macro and/or mesoporous materials or smaller porosity materials such as catalyst supports that provide high surface area. Porosity as measured by N2 BET gas adsorption (for smaller pore sizes) and mercury intrusion porisimetry (for larger sizes). The "porous" channel wall has through-porosity such that $CO_2$ can pass through the channel wall.

A "steam reforming catalyst" can be any steam reforming catalyst known in the literature, and is preferably selected to optimize reaction at the desired temperature for operation. Likewise a "water-gas shift catalyst" can be any material known in the literature for catalyzing the water gas shift reaction.

An "open bulk flow path" is an unobstructed flow path having a diameter of at least 50 μm.

As is conventional terminology, the invention can be described as "comprising" meaning "including." In any of the embodiments, described as "comprising," the invention may alternatively be described more restrictively as "consisting essentially of" or "consisting of" selected features, properties or elements.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 16A-16B show stability of sorbent beds with repeated sorption/regeneration cycling (sorption conditions: 500° C., $H_2O$/dry gas=1) FIG. 16A shows various conditions on various days; FIG. 16B shows $H_2O$/dry gas=1:1, P=2.0 bar, $17^{th}$ day.

DETAILED DESCRIPTION OF THE INVENTION

Figure 1A:
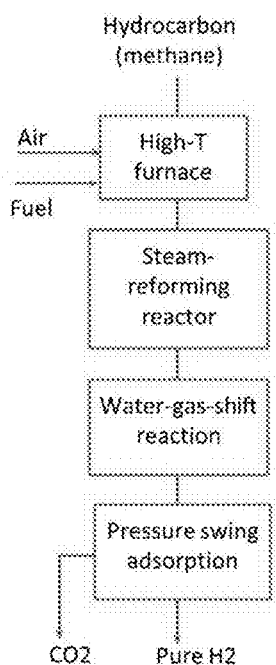
FIGS. 1A-1C. Process flow diagrams comparing conventional hydrogen production processes (FIGS. 1A-1B) with a simplified flow diagram enabled by present invention (FIG. 1C).
Figure 1B:
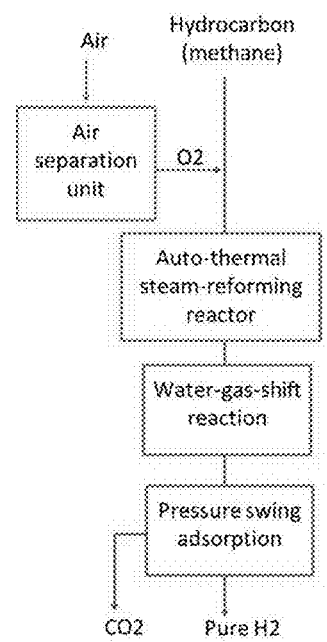
Figure 1C:
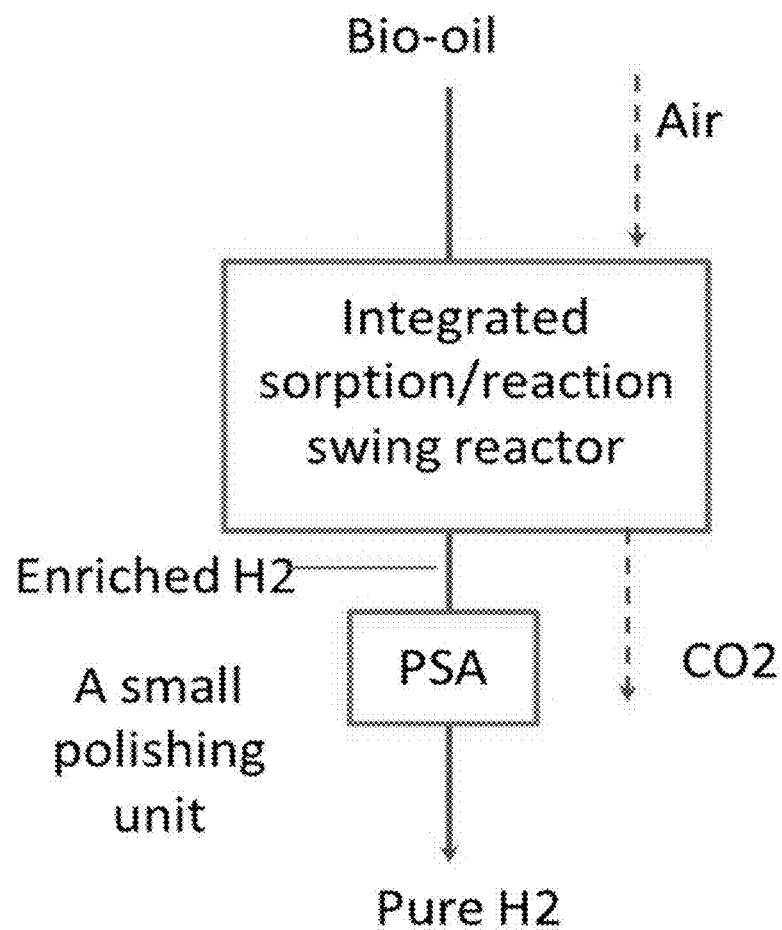

One of the advantages of the present invention is that it can reduce the size and complexity of hydrogen production processes and devices. Compared to the conventional hydrogen production processes (FIGS. 1A-1B), the inventive process (FIG. 1C) produces a hydrogen-rich stream from one reactor vessel without using large external furnace to heat the reactor, without requiring any oxygen, and without requiring a separate water-gas-shift reactor. A down-stream hydrogen purification unit can be dramatically downsized by producing a $H_2$-rich stream.

Figure 2:
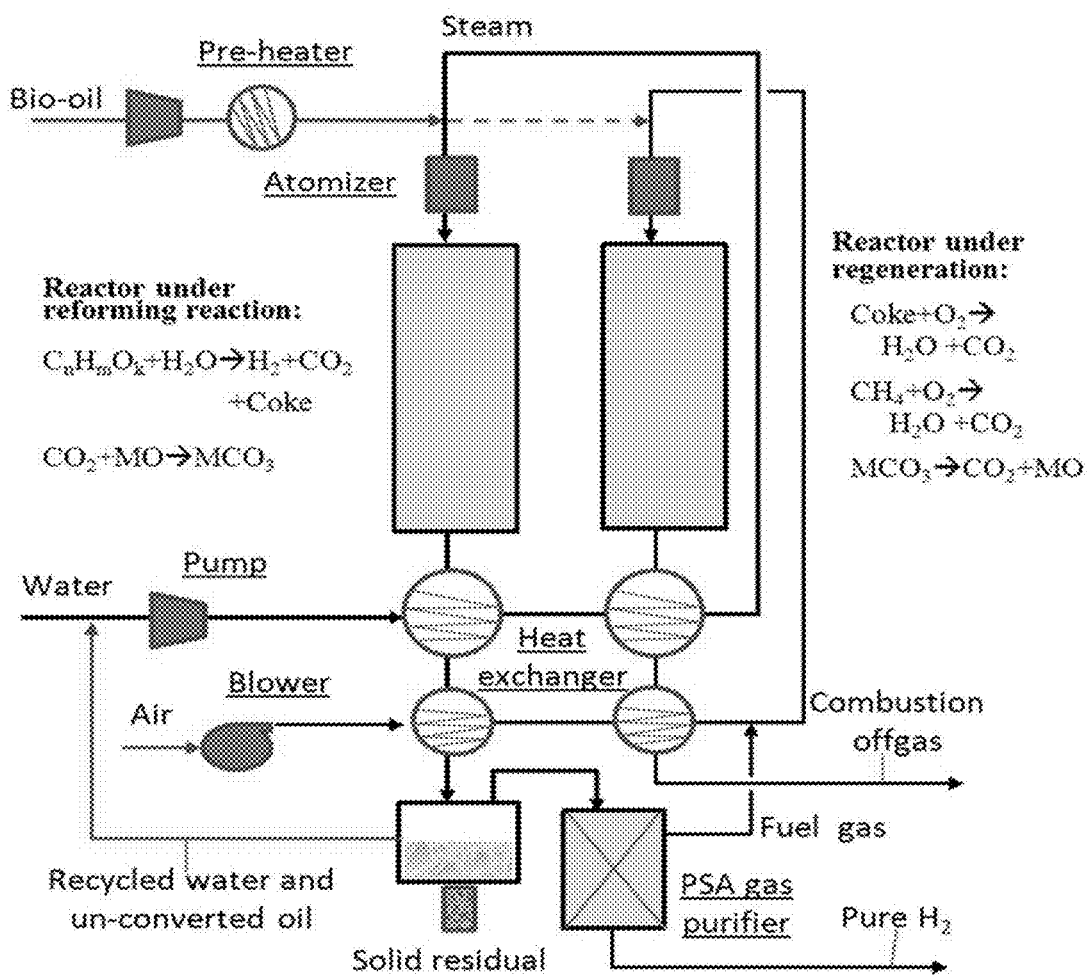
FIG. 2 schematically illustrates a swing reactor configuration for production of a H2-rich stream.

FIG. 2 schematically illustrates a swing reactor configuration for production of a H2-rich stream. In a preliminary step, bio-oil liquid can be converted to an aerosol with steam and introduced into the catalyst bed. The droplet size is preferably smaller than the channel opening (and, preferably, is 1 mm or less). There are several techniques to obtain uniform distribution at this scale. The steam laden with the dispersed oil droplets flows through the monolith channel. Upon exposure to the hot catalyst, the majority fraction of the bio-oil may be vaporized for gas-phase SR and residual liquid is spread onto the channel wall as a thin film for liquid-phase SR.

The following are the likely reactions occurring in the bed.

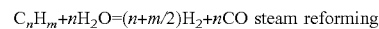
$C_nH_m + nH_2O = (n+m/2)H_2 + nCO$ steam reforming

$CO + H_2O = H_2 + CO_2$ water gas shift

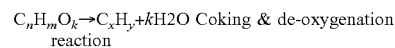
$C_nH_mO_k \rightarrow C_xH_y + kH2O$ Coking & de-oxygenation reaction

$CO_2 + MO = MCO_3$ CO2 capture $CO_2$ produced by the reforming reactions is captured with a metal oxide sorbent (MO). The exothermic carbonation reaction supplies heat to the endothermic SR reaction. The coking reactions are also exothermic. In the short term, aromatic-type coke containing some H element is typically formed which is reactive to oxidation. Graphite-type coke (nearly free of H), which tends to occur in the long term, can be avoided by frequent regeneration.

When the $CO_2$ sorbent is saturated and $H_2$ yield becomes low due to decreased temperature and catalyst deactivation, the reactor is switched to regeneration mode. Hot air or O2-containing gas is introduced into the catalyst bed to burn off the coke. As the catalyst bed is heated up, the metal carbonate decomposes to release $CO_2$, thus regenerating the $CO_2$ sorbent. The heat of carbonate decomposition may be partially or completely supplied by the combustion reaction. Residual fuel gas, which is rejected from the downstream PSA purification process, can be fed into the reactor undergoing regeneration and burned to supply additional heat. After regeneration, the reactor is switched back to the SR mode. In this way, the catalyst is maintained in an active state so that the SR reaction can be run at high space velocity.

Figure 3:
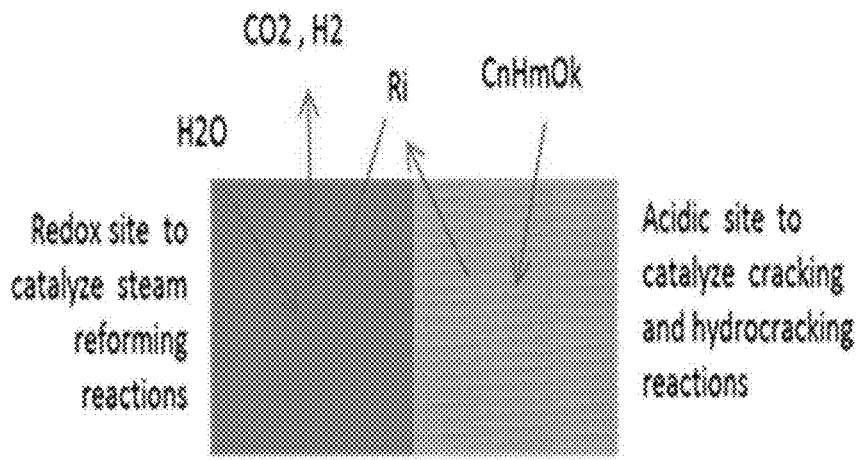
FIG. 3 schematically illustrates a catalytic system for combined cracking and steam reforming reaction in the same catalyst structure.

The compositions and structures of a preferred catalyst system of present invention are illustrated in FIG. 3. In this model, a working catalyst provides two kinds of active catalysis sites—acidic and redox. The acidic site enables cracking of larger bio-oil molecules (or polymers) into smaller molecules, while the redox site catalyzes steam reforming reactions to convert the bio-oil molecule or its fragments into $CO_2$ and $H_2$. These two sites are made adjacent each other so that concerted effects can be realized. The new catalyst system will preferably be active after air calcination. The materials providing redox catalytic sites are preferably metal oxide nano-composites consisting of transition metal (Ni, Cu, Fe) oxides and metal oxides of oxygen mobility ($CeO_2$, $ZrO_2$—$CeO_2$, $TiO_2$). The catalyst is activated by air calcination. The materials providing acidic sites can be γ-alumina, ultra-stable zeolite Y, beta-zeolite, or HZSM-5.

Figure 4:
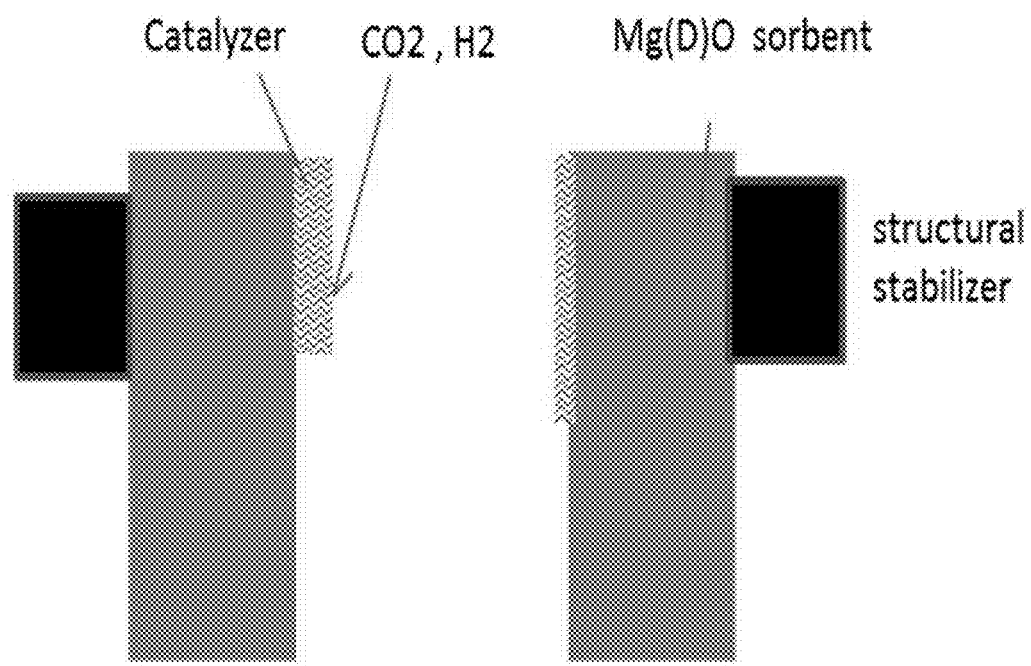
FIG. 4 schematically illustrates a catalytic system with catalyst adjacent the CO2 sorbent.

FIG. 4 illustrates a new sorbent design model. The MgO-based sorbent system is targeted by this work for low-temperature sorption (<400° C.) and CaO-based sorbent system is targeted for high-temperature sorption (>350° C.), based on thermodynamic calculation. In addition to chemical and physical properties, cost is an important factor to select raw materials for preparation of new sorbents.

Figure 5:
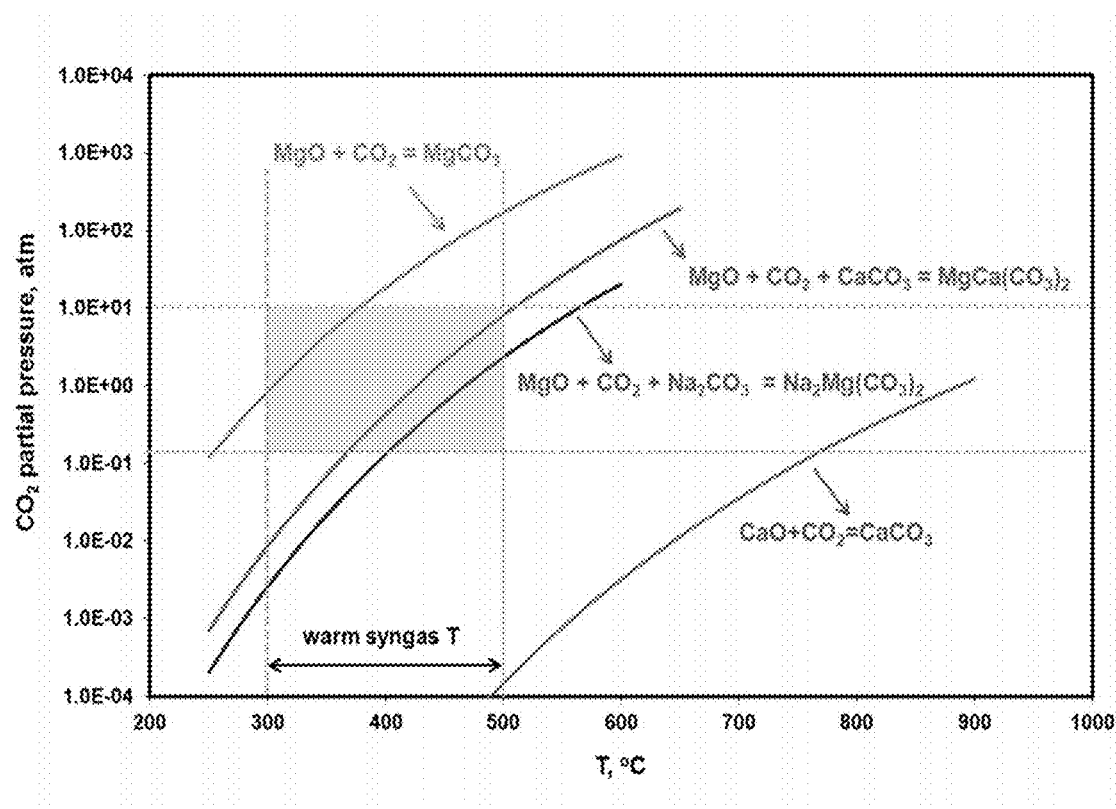
FIG. 5 Thermodynamic equilibrium curves of MgO carbonation and CaO carbonation.

FIG. 5 shows that the pure MgO sorbent has a working temperature at lower end of the temperature range of present interest. The working temperature of CaO is at the upper end. Thus, thermodynamic equilibrium constant can be modified by introducing dopants into MgO lattice structures or by making $MgCO_3$ form a compound with other metal carbonates. The preferred dopant is CaO or $CaCO_3$. Vice verse, sorption properties of CaO may be modified by introduction of MgO. Sorption and regeneration kinetics is another important performance factor for a working catalyst. Two approaches have been explored to develop a stable sorbent of rapid kinetics. One approach is to stabilize the pore structures of the reactive material by use of some stabilizers so that the pore structures would be stable during constant conversion between MO and MCO3. The preferred stabilizing materials include $Na_2CO_3$, $K_2CO_3$, MgO, $CaCO_3$, $Al_2O_3$, and $TiO_2$. The stabilizers are the material that maintains a stable structure under sorption/regeneration conditions. Another approach is to catalyze reaction kinetics of $CO_2$ gas with MO solid by incorporation of some catalytic materials at gas/MO interfaces. The possible catalytic materials are molten carbonates and/or nitrates of alkaline elements (Li, Na, K), which are alternatively called promoters in the descriptions herein. The preferred catalytic materials are molten carbonates of alkaline elements (Li, Na, K), because of its chemical and thermal stability.

Figure 6A:
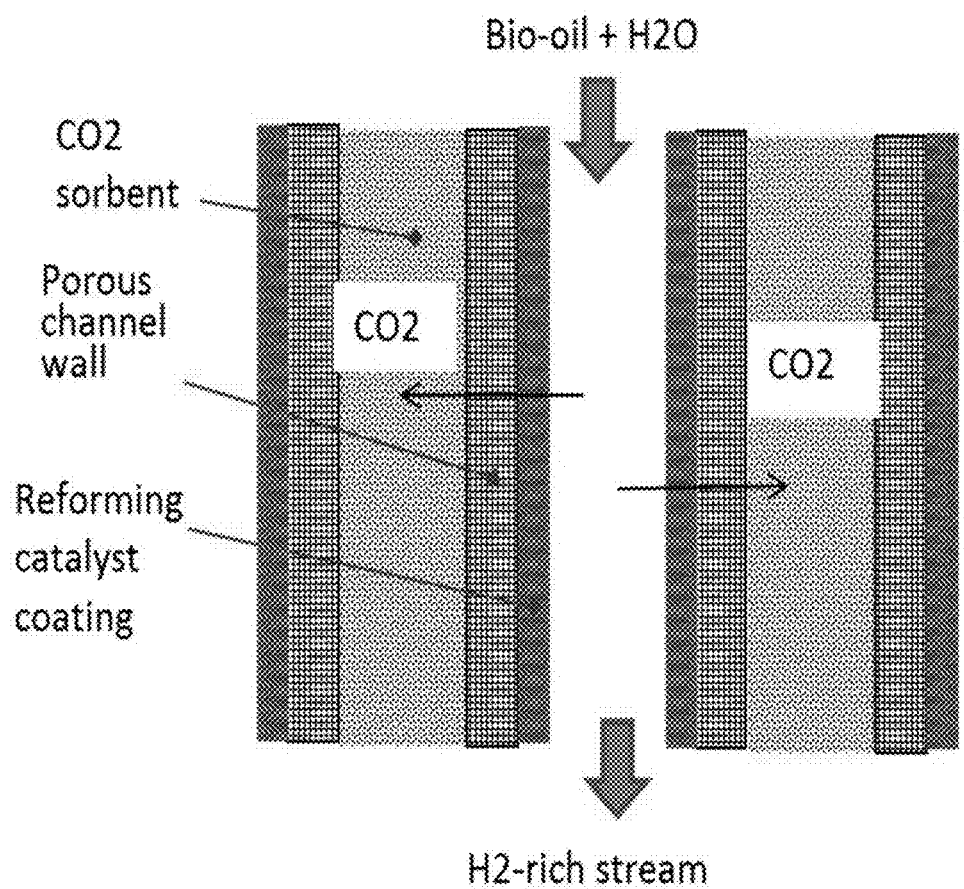
FIG. 6A schematically illustrates a monolithic bed structure with a porous, inert reaction channel wall.
Figure 6B:
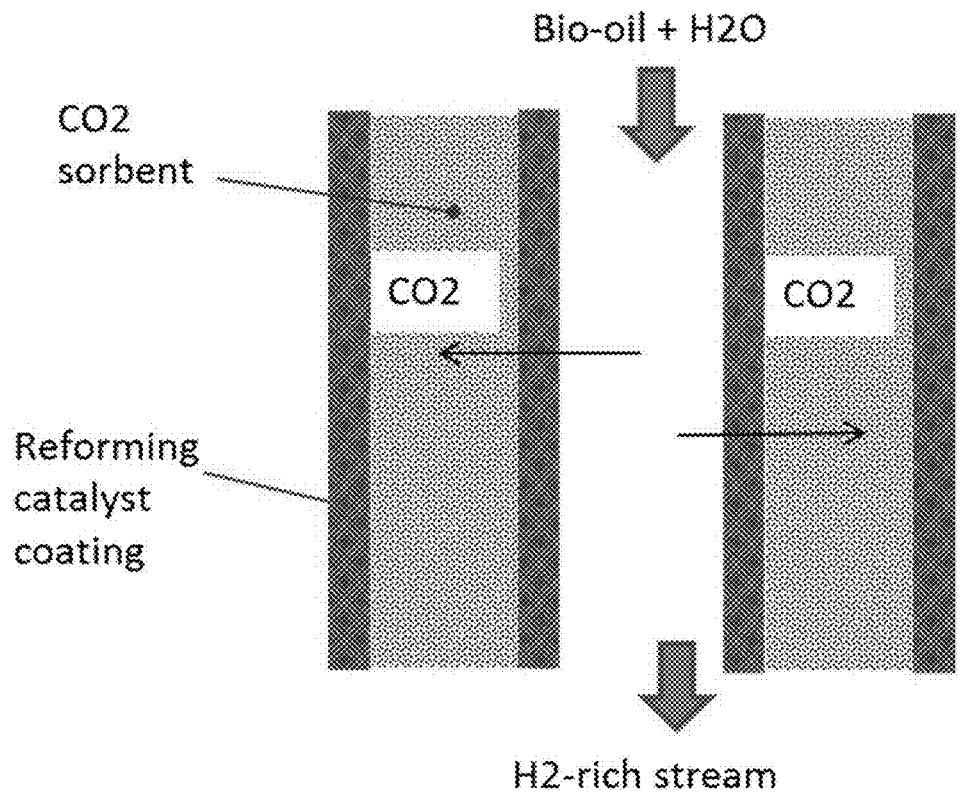
FIG. 6B schematically illustrates a monolithic bed structure with a porous, catalytically active reaction channel wall.

The reforming catalyst and $CO_2$ sorbent materials are made into monolithic bed structures in the reactor. FIG. 6 shows two possible ways to construct such a monolith bed. One way (FIG. 6a) is to use an inert monolith substrate of porous walls, fill the alternate channels with the $CO_2$ sorbent powder, and coat the reforming catalyst on the wall of open channels. As the bio-oil and steam flows through the channel, the reforming reaction takes place on the channel wall, produced $CO_2$ diffuses across the channel wall and reacts with the $CO_2$ sorbent. Another way is to use an active monolith substrate of channel walls comprising an active reforming catalyst. The $CO_2$ sorbent is used to fill alternate channels. In such a configuration, $CO_2$ mass transfer distance and heat transfer distance between the reforming site and $CO_2$ capture site are minimized.

In the monolith bed design, the SR catalyst, WGS catalyst (optional), and CO2 sorbent can be integrated in the same reactor thereby minimizing mass and heat transfer resistance between the SR reaction and carbonation reaction. Essentially, all these sequential reactions can occur at the same spot.

Compared to the packed bed, the monolith bed includes the following advantages:
Straight flow channels minimizes the dead space in the bed, avoids accumulation of residuals and particulates in the bed, and enables rapid changeover of reacting fluids;
Straight flow channels provide a low pressure drop and minimize parasitic power consumption during regeneration;
the reactions are confined inside individual channels and temperature run-away due to auto-thermal reactions can be mitigated; and
adsorbent and catalyst materials are integrated into a fixed structure, and particle attrition and bed upset can be avoided during rapid swing operation.

The monolithic reactor also provides unique performance attributes compared to fluidized beds. Fluidized beds have been studied for both bio-oil SR and biomass gasification. It is a commercially-proven technology for coupling of endothermic and exothermic reactions, and one successful example is the fluid catalytic cracking (FCC) process in refineries. However, the circulating fluidized bed (CFB) system involves complex designs and requires highly specialized technical resources to operate and maintain. For a stand-alone H2 production plant with a capacity that is orders of magnitude smaller than the FCC process, it will be difficult to make such a unit economical. The proposed monolith reactor is compared to CFB as follows:
there is no loss of catalyst and sorbent in the monolith reactor, while significant catalyst loss could occur in the fluidized bed due to severe particle attrition and entrainment in reactor effluents;
the monolith reactor enables the CO2 sorbent coupled with the reforming catalyst in a layer-by-layer structure, while sorbent and catalyst particles can be segregated in CFB; and
the monolith reactor has a simple, modular-type structure that can be scaled up by numbering up of reaction channels. Automotive catalytic converters and diesel particulate filters are examples of how compact a monolith reactor can be made. In contrast, CFB designs are significantly affected by their processing capacity scale and the unit must be large to obtain high productivity.

The monolith reactor makes it possible to develop a compact H2 production plant with a simple process flow diagram (FIG. 2). High (>90%) energy efficiency may be realized through effective thermal management at plant scale. The reactors are insulated to prevent heat loss. Thermal energy from reactor effluents is recovered through heat exchange with feed streams. Though two reactors are used to conduct respective reforming and regeneration reactions, the overall reactor size will be reduced by conducting the reforming reaction at a higher space velocity than the conventional SR reactor. >90% $H_2$ gas stream can be produced from the reactor with in situ $CO_2$ capture, which will reduce the PSA size compared to the conventional process. The high-temperature furnace and WGS reactor can be eliminated.

Figure 7:
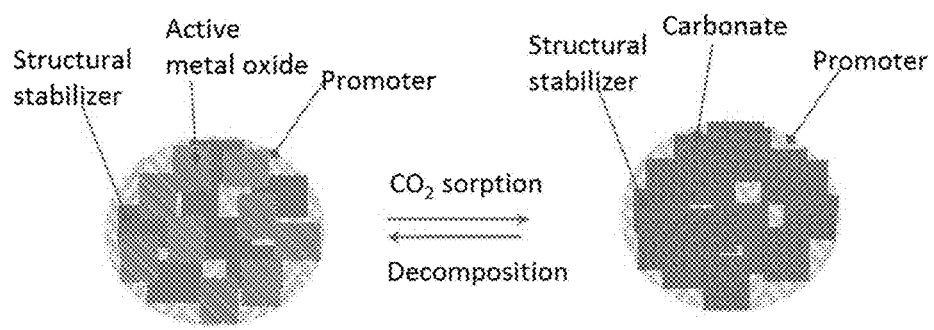
FIG. 7 is a schematic illustration of a CO2 sorbent material system according to the present invention.

As illustrated in FIG. 7, a composite sorbent comprises an inert phase, an active phase, and a promoting phase. The active phase reacts with $CO_2$ under sorption conditions and releases $CO_2$ under regeneration conditions. The preferred materials for the active phase are MgO, CaO, $Mg(OH)_2$, $Ca(OH)_2$, or mixture thereof. The inert phase maintains its crystalline structures during carbonation under the sorption conditions and de-carbonation of the active phase under the regeneration conditions, and thus, serves as a structural stabilizer. The preferred inert materials are MgO, $CaCO_3$, alkaline carbonates, ceramic oxides ($Al_2O_3$, $CeO_2$, $ZrO_2$), and mixture thereof. The same material may function as an active phase or inert phase for different application conditions. For example, MgO is an active phase at working temperatures below 450° C. but can be an inert phase for working temperatures above 400° C. The particle or grain sizes of these two phases should be kept as small as possible to maximize the specific reaction surface area. The promoter is dispersed in the composite matrix to catalyze reaction of $CO_2$ gas with the active phase and/or subsequent decomposition of the carbonate. The preferred promoters are eutectic alkaline carbonates that become liquid at the sorption and regeneration temperatures. For example, LiNaK-carbonate has a melting point around 400° C. and serves as an effective promoter at working temperatures around and above 400° C. The promoter is uniformly distributed in the composite sorbent and the liquid-phase promoter may be retained inside the composite pores by capillary force.

After the sorbent was tested through tens of sorption/regeneration cycles, a fully-activated working sorbent containing the three major crystal phases, MgO, CaO, and Ca(OH)$_2$, was formed, as evidenced by XRD analysis. As expected, MgO crystal phase was intact during the sorption and regeneration as a structural stabilizer. The CaCO$_3$ crystal phase was not present in an activated sorbent or its presence is minor. CaO can be converted into Ca(OH)$_2$ in the presence of water vapor. The LiNaK-carbonate phase remained dispersed and was not detectable by the XRD. The following are possible chemical reactions involved in the sorbent preparation and sorption/regeneration processes.

Partial decomposition of dolomite at temperatures lower than 500° C.:

$$CaMg(CO_3)_{2(s)} \rightarrow MgO_{(s)} + CaCO_{3(s)} + CO_{2(g)} \quad (1)$$

Fully-decomposed dolomite at temperatures higher than 700° C.:

$$CaMg(CO_3)_{2(s)} \rightarrow MgO_{(s)} + CaO_{(s)} + 2CO_{2(g)} \quad (2)$$

In the presence of H$_2$O $$CaO_{(s)} + H_2O_{(g)} \rightarrow Ca(OH)_{2(s)} \quad (3)$$

CO$_2$ sorption/regeneration:

$$CaO_{(s)}/MgO_{(s)} + CO_{2(g)} \leftrightarrow CaCO_{3(s)}/MgO_{(s)} \quad (4)$$

$$Ca(OH)_{2(s)}/MgO_{(s)} + CO_{2(g)} \leftrightarrow H_2O_{(g)} + CaCO_{3(s)}/MgO_{(s)} \quad (5)$$

As illustrated by SEM images, the as-prepared and activated sorbent have similar micro-structures. Ca, Mg, and alkaline metals are all well mixed at micrometer scale in both fresh and activate sorbents as a composite rather than as segregated particles. The molten carbonate works as a phase transfer catalyst to facilitate the sorption and regeneration reaction process.

EXAMPLES

Example I CO$_2$ Sorbent Preparation

The dolomite-based composite sorbent was prepared in the following way. The Li$_2$CO$_3$—Na$_2$CO$_3$—K2CO3 eutectics (LiNaKCO$_3$) has a melting point about 397° C. It was prepared by mixing 32.2 wt. % Li2CO3 (99%, Sigma Aldrich), 33.3 wt. % Na2CO3 (99%, Sigma Aldrich) and 34.5 wt. % K$_2$CO$_3$ (99%, Sigma Aldrich). The powder mixture was ground together and then heated to 410° C. for 1 hr. The resulting eutectic was crushed and ground to a fine powder. Dolomite from City Chemical was used as received of after calcination at 850° C. for 4 hours in air. The dolomite was mixed with LiNaK—CO$_3$ at desired weight ratio by ball milling. The solid mixture was added into a Nalgene plastic bottle and mixed with 2-propanol (EMD Chemicals, Canada) and zirconia beads (diameter: 0.3-1.0 cm). The bottle was rotated at a speed of 150-200 rpm for 48-72 hours. The resulting slurry was dried at room temperature (RT) to allow evaporation of 2-propanol. Following drying, the cake was calcined at 350° C. or 725° C. in air in an alumina crucible for 3 hours. The comparative CaO sorbent was prepared by calcining Ca acetate (Alfa Aesar, 97%) at 800° C. for 3 hrs. The comparative MgO sorbent was obtained by calcining Mg$_5$(CO$_3$)$_4$(OH)$_2$.xH$_2$O power (99%, Sigma Aldrich) at 450° C. in air for 3 hours.

Dolomite alone sorbent was prepared by heating an as-received dolomite mineral (City Chemical) was at 850° C. for 3 hours in a furnace to obtain complete decomposition.

MgO was obtained by calcining Mg$_5$(CO$_3$)$_4$(OH)$_2$.xH$_2$O power (99%, Sigma Aldrich) at 450° C. for 3 hours in air. MgO was mixed with Na$_2$CO$_3$ (99%, Sigma Aldrich), Li$_2$CO$_3$ (99%, Sigma Aldrich), and K$_2$CO$_3$ (99%, Sigma Aldrich). The mixture contained 44 wt % MgO, 48 wt % Na$_2$CO$_3$, 3.9 wt % Li$_2$CO$_3$ and 4.2 wt % K$_2$CO$_3$. Typically, 33.5 g of the solid mixture was mixed with 60-100 g of 2-propanol (EMD Chemicals, Canada) and 120 g-200 g of zirconia beads (diameter: 0.3-1 cm). The bottle was rotated for 48-72 hours at a speed of 150-200 rpm. The obtained slurry was dried at RT ° C. in plates to evaporate 2-propanol and form thin cake (0.2-0.5 mm). Following the dry, the cake was calcined at 450° C. for 3 hrs. The calcined cake was crushed and sieved to 40-100 mesh particles for fixed-bed tests.

Example II CO$_2$ Sorption Performances by TGA Tests

Performance characteristics of sorbents for CO$_2$ capture under steam-reforming conditions were tested on a thermo gravimetric analyzer (TGA, Netzsch Thermal Analysis, STA 409 cell) at ambient pressure. The sample weight for each test was approximately 20 mg. CO$_2$ absorption was evaluated by heating sample in 10-100% CO$_2$ to 500-600° C. Cyclic CO$_2$ absorption and desorption were evaluated by exposing the sample to the CO$_2$ gas for 50 minutes at 550° C. and then, raising the temperature in N2 flow and holding at 700° C. for 60 minutes. The gas flow rates for the sorption and regeneration processes were maintained at 70 ml/min and 90 ml/min, respectively. The heat of absorption was measured along with the TG tests through differential scanning calorimetry (DSC). The TGA tests help to identify CO$_2$ sorption and regeneration temperatures, measure CO$_2$ sorption capacity, and assess sorption and regeneration kinetics.

Figure 8A:
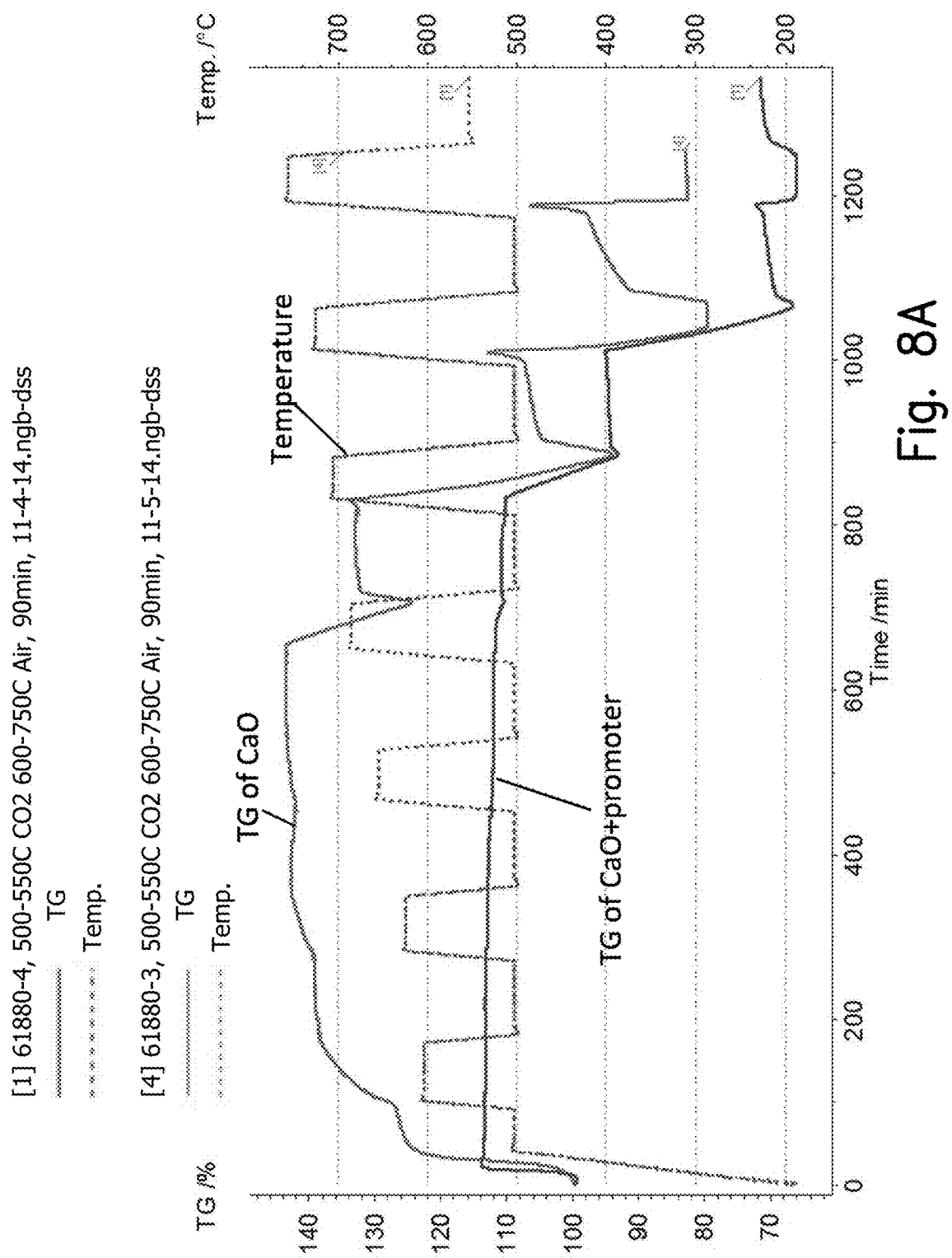
FIGS. 8A-8B show $CO_2$ sorption performances of CaO sorbents (comparative base: as-prepared CaO, CaO+10 wt % LiNaK-carbonate); (8A). At 500° C. constant sorption temperature but different regeneration temperature; (8B). At 700° C. constant regeneration temperature but different sorption temperature.

For comparison, performances of CaO sorbents are shown in FIG. 8. FIG. 8a shows that the CaO sorbent weight increased with CO$_2$ capture, and weight loss occurred only when the regeneration temperature was increased to 680° C. More regeneration occurred as the temperature was raised to 750° C. The regeneration temperature was not lowered by adding about 10 wt % promoters into CaO. The working capacity at higher regeneration temperatures diminished due to addition of this promoter. The results indicate sensitivity of CaO sorbent performances to the kind of promoters added.

Figure 8B:
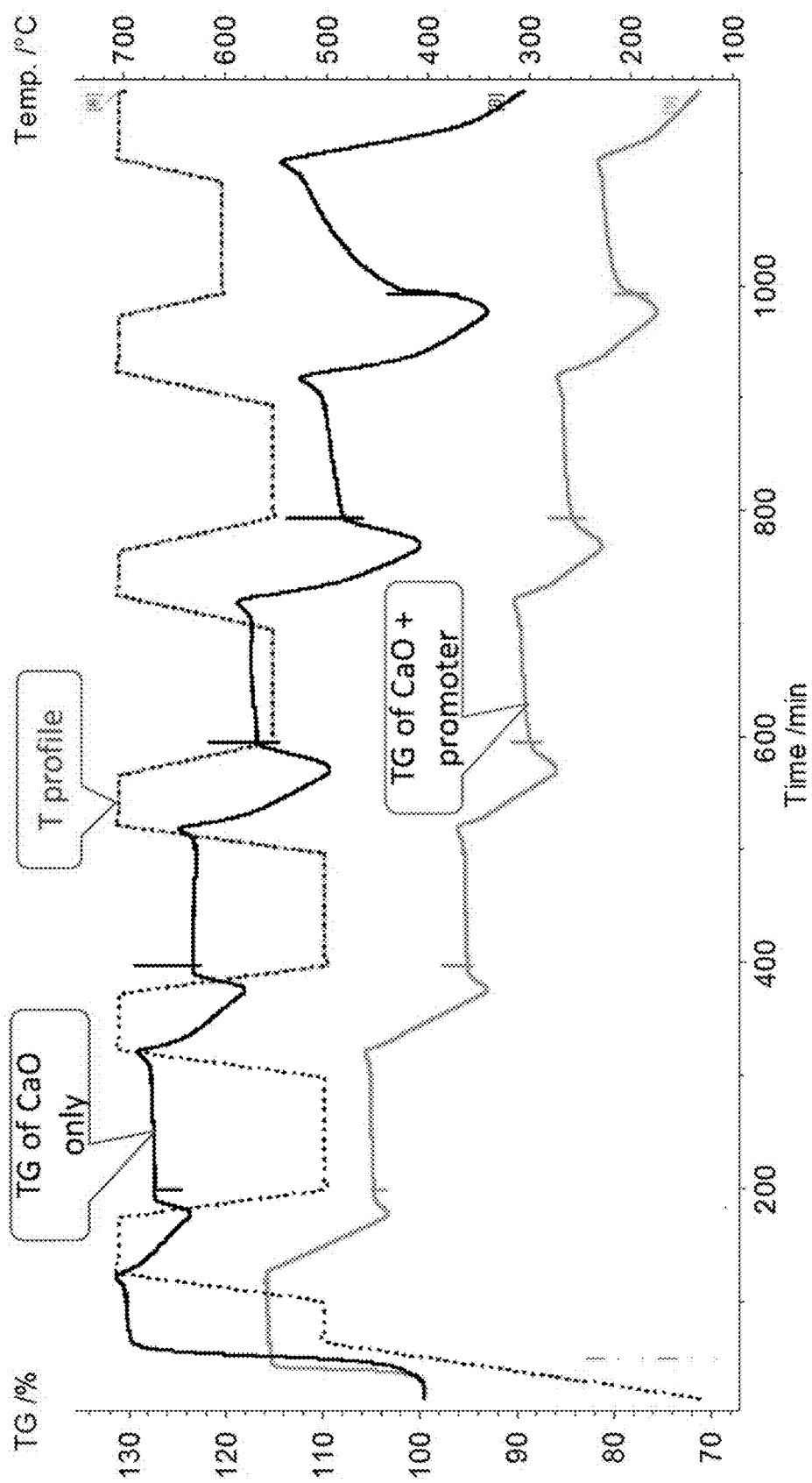

Furthermore, sorption/regeneration performances of the CaO sorbents with and without the promoter are compared at different sorption temperatures but under constant regeneration temperature at 700° C. in FIG. 8b. The CaO sorbent shows a little CO$_2$ uptake at 500° C. sorption temperature. The CO$_2$ sorption increases as the sorption temperature is raised to 550° C. and 600° C. By contrast, the promoter-added CaO provides less CO$_2$ uptake than the CaO alone. The results indicate that the promoter works more effectively for the proposed composite sorbent structure in which a structural stabilizer is present. The CaO material alone may not be able to hold the molten carbonate promoter during the sorption/regeneration cycle.

Because Mg and Ca are cheap alkaline earth metals, their compounds are attractive materials for CO$_2$ capture application. Dolomite is a natural mineral of Mg and Ca carbonate compounds. At lower temperature, $MgCO_3$ in dolomite is decomposed, whereas $CaCO_3$ would decompose at a higher temperature.

$$MgCa(CO_3)_2 \rightarrow MgO + CaCO_3 + CO_2 \text{ at } 400\text{-}450°C.$$

$$MgCa(CO_3)_2 \rightarrow MgO + CaO + CO_2 \text{ at } 700\text{-}850°C.$$

Figure 9:
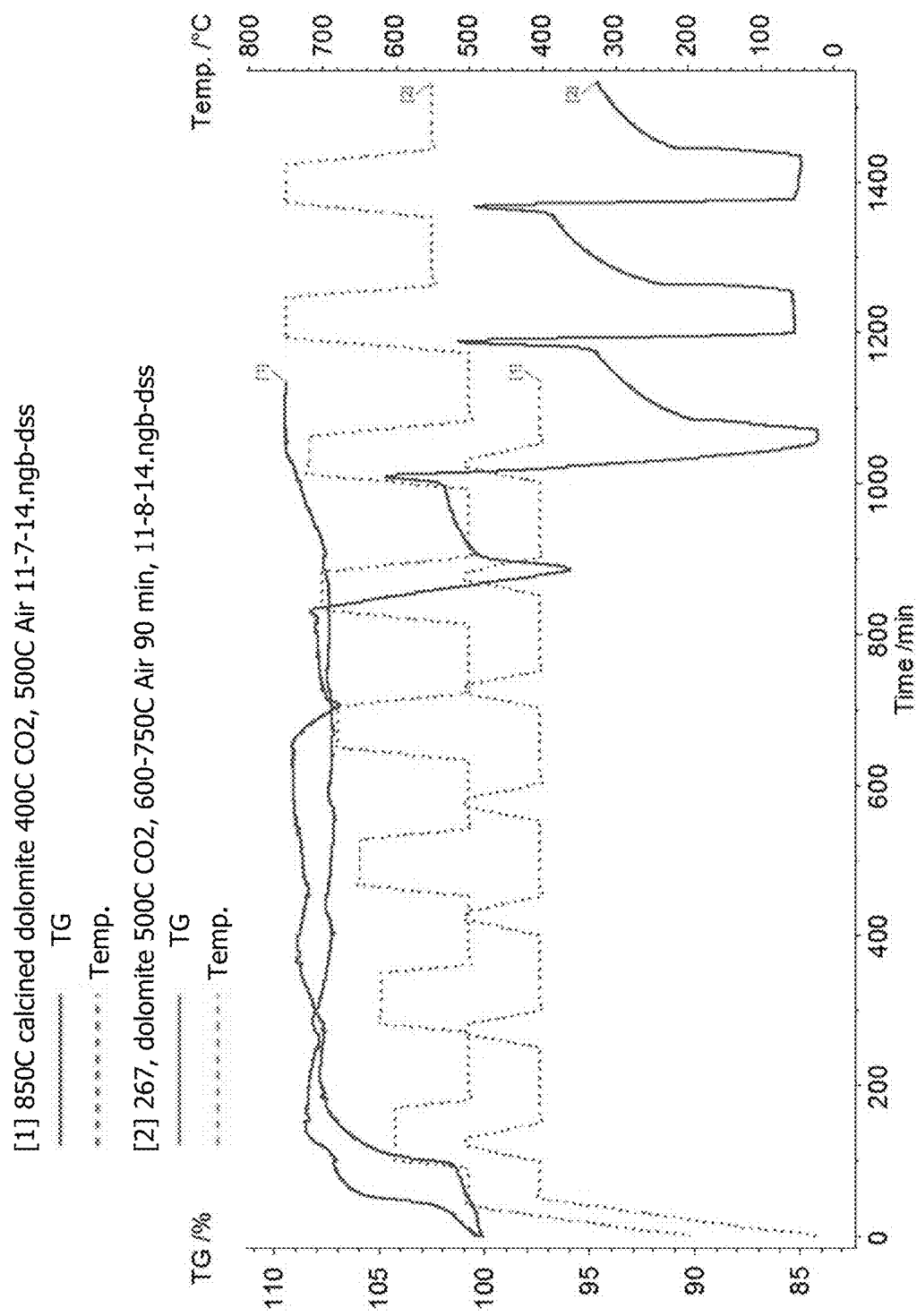
FIG. 9 TGA testing results of dolomite sorbent under two sets of sorption and regeneration conditions (comparative base); Green lines denoted as [1]=sorption: 400° C., $CO_2$, 99 min; regeneration: 500° C., air, 51 min; Red lines denoted as [2]=sorption: 500° C., $CO_2$, 90 min; regeneration: 600-750° C., air, 90 min.

To investigate feasibility of using this raw material for present application, the pre-calcined dolomite powder was tested under two sets of sorption/regeneration conditions (FIG. 9). At 500° C. regeneration temperature, no significant weight change was observed as the conditions were switched between sorption and regeneration. The sorbent was likely saturated by $CO_2$ and the resulting carbonate did not decompose at the regeneration temperature. The weight gain/loss cycles appeared only when the regeneration was conducted at 700° C. and above. The results indicate that 700° C. is required to regenerate this sorbent.

Figure 10:
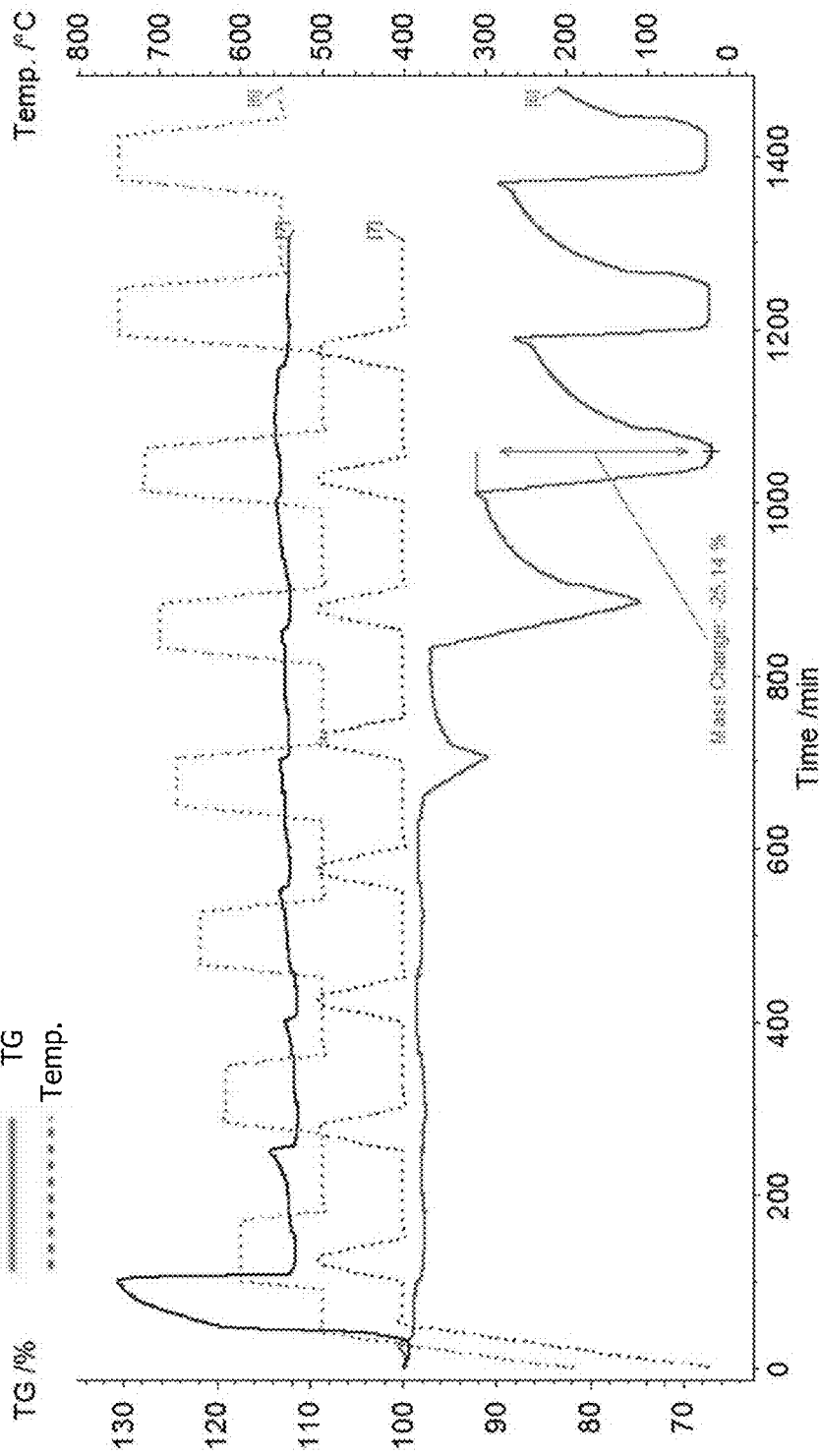
FIG. 10 TGA testing results of dolomite+10 wt % LiNaKCO3 composite sorbent under two sets of sorption and regeneration conditions; Red lines denoted as [7]=sorption: 400° C., $CO_2$, 99 min; regeneration: 500° C., air, 51 min; Blue lines denoted as [6]=sorption: 500° C., $CO_2$, 90 min; regeneration: 600-750° C., air, 90 min.

FIG. 10 shows the TGA testing results of the dolomite composite sorbent of present invention, which was prepared by adding 10 wt % LiNaK-carbonate into the above dolomite as promoter. The sorbent was tested under two sets of conditions. In first set of conditions, the sorption and regeneration temperatures were kept constant at 400° C. and 500° C., respectively. No apparent CO2 sorption working capacity was obtained in sorption/regeneration cycles, because the regeneration temperature was too low. In another set of testing conditions, the sorption temperature was kept constant at 500° C. while the regeneration temperature was varied from 600 to 750° C. Little CO2 working capability was shown at regeneration temperature below 700°. The working capacity becomes significant at and above 700° C. regeneration temperature. The sorption equation is expressed as follows:

$$CaO_{(s)}/MgO_{(s)} + CO_{2(g)} \leftrightarrow CaCO_{3(s)}/MgO_{(s)}$$

Figure 11:
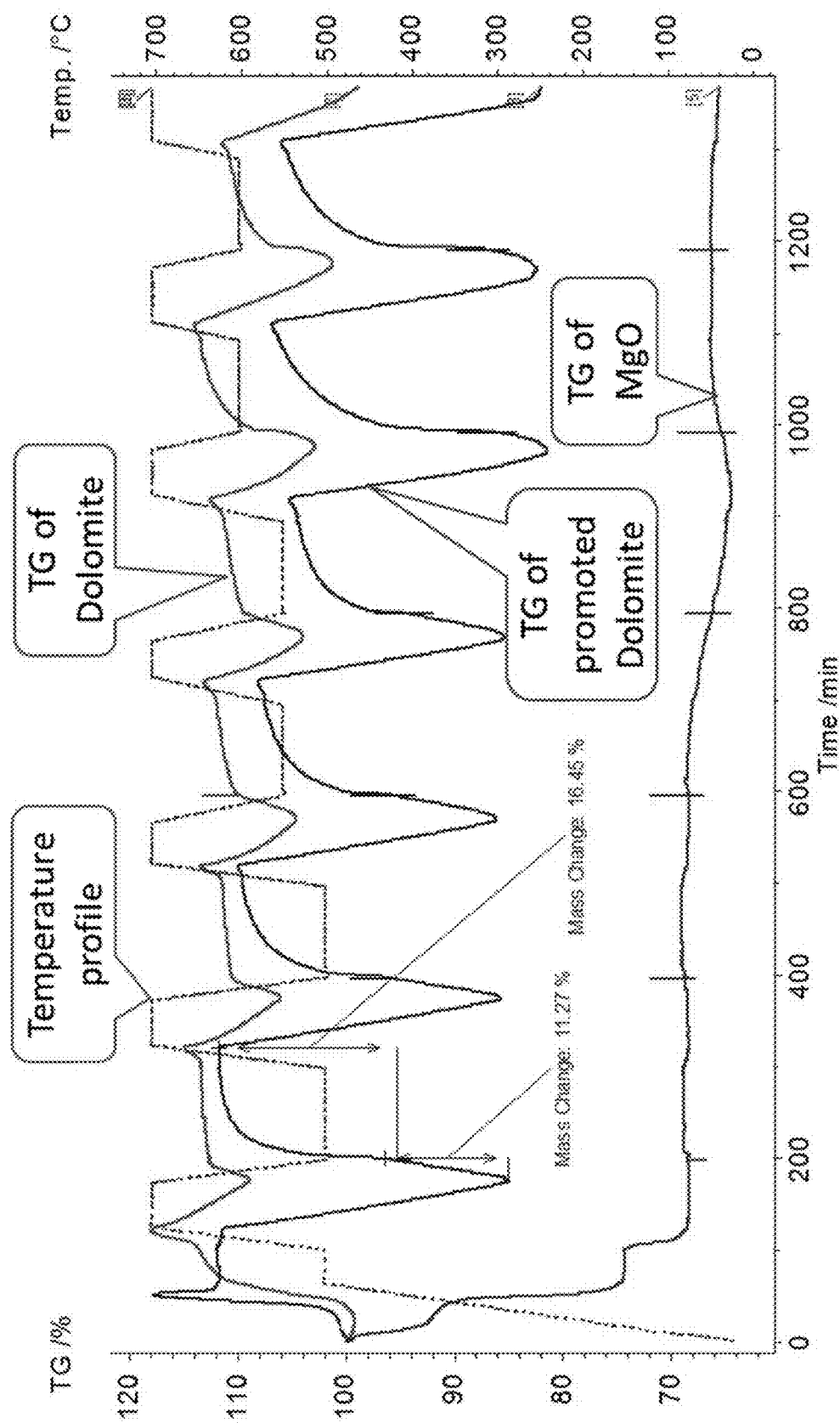
FIG. 11 Synergistic effects of the proposed composite sorbent design (sorption in 10% $CO_2$, regeneration at 700° C. in $N_2$ for all the runs).

In FIG. 11, testing results for MgO, dolomite, and dolomite composite sorbents are compared under the identical sorption/regeneration conditions. The dolomite composite was prepared by dispersing 10 wt % LiNaK—CO3 in dolomite. Synergistic effects of the composite sorbent design are clearly demonstrated. While the regeneration conditions (700° C. in air) were kept constant, $CO_2$ sorption in was conducted at 500° C. for first two cycles, 550° C. for next two cycles and at 600° C. for last two cycles. There was little weight change for the MgO sorbent during these cycles, which confirms that MgO is an inert phase under these working conditions. Compared to the dolomite alone, the promoted dolomite shows much rapid sorption and desorption, and a large $CO_2$ sorption working capacity.

Figure 12:
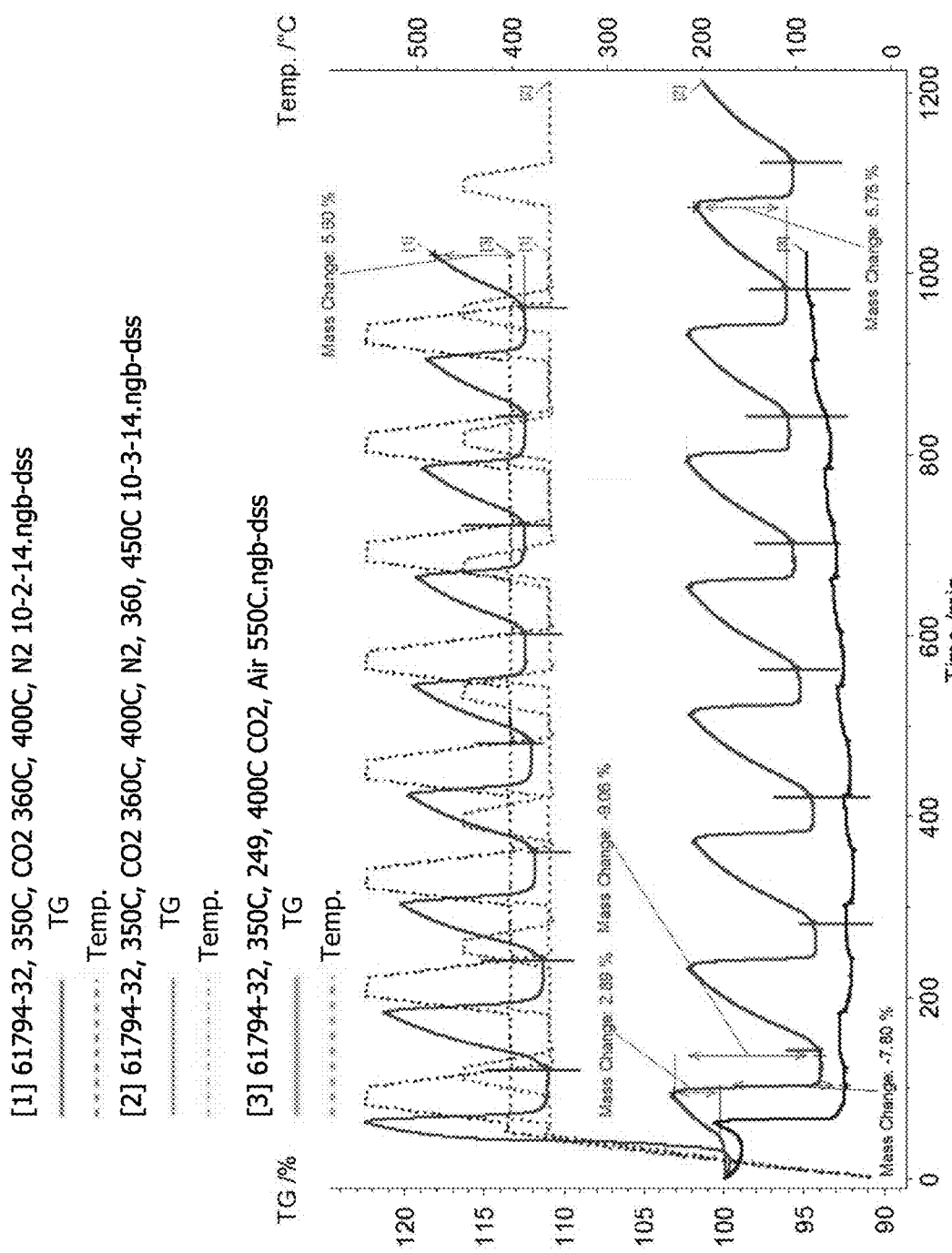
FIG. 12 TGA testing results of dolomite+10 wt % LiNaK—CO3 composite sorbent at lower working temperatures; Green line denoted as [1]=sorption: 360° C., $CO_2$; regeneration: 400° C., $N_2$ Red line denoted as [2]=sorption: 360° C., $CO_2$; regeneration: 450° C., $N_2$; Blue line denoted as [3]=sorption: 400° C., $CO_2$; regeneration: 550° C., air.

The above dolomite composite sorbent can be used at lower working temperatures, in which MgO becomes an active phase while $CaCO_3$ functions as an inert phase. FIG. 12 shows performances of the dolomite composite sorbent at lower sorption and regeneration temperatures.

$$MgO_{(s)}/CaCO_{3(s)} + CO_{2(g)} \leftrightarrow MgCO_{3(s)}/CaCO_{3(s)}$$

The sorbent was tested under three sets of sorption/regeneration conditions. The solid green and red lines in FIG. 12 represent the weight changes in two runs with respective 400 and 450° C. regeneration temperatures at the same sorption temperature (360° C.). The $CO_2$ working capacity was stabilize around 5.6 wt. % after several cycles with 400° C. regeneration. The working capacity was about 5.75 wt. % with 450° C. regeneration temperature. The results indicate that $CO_2$ captured at 360° C. can be efficiently regenerated at 400° C. The tests with 400° C.-sorption and 550° C.-regeneration temperature (dashed blue line) showed no significant weight change (solid blue line) during the sorption/regeneration cycles. The results suggest that working sorption temperature and regeneration temperatures for this composite sorbent are less than 400° C. and above 400° C. -450° C., respectively.

Figure 13:
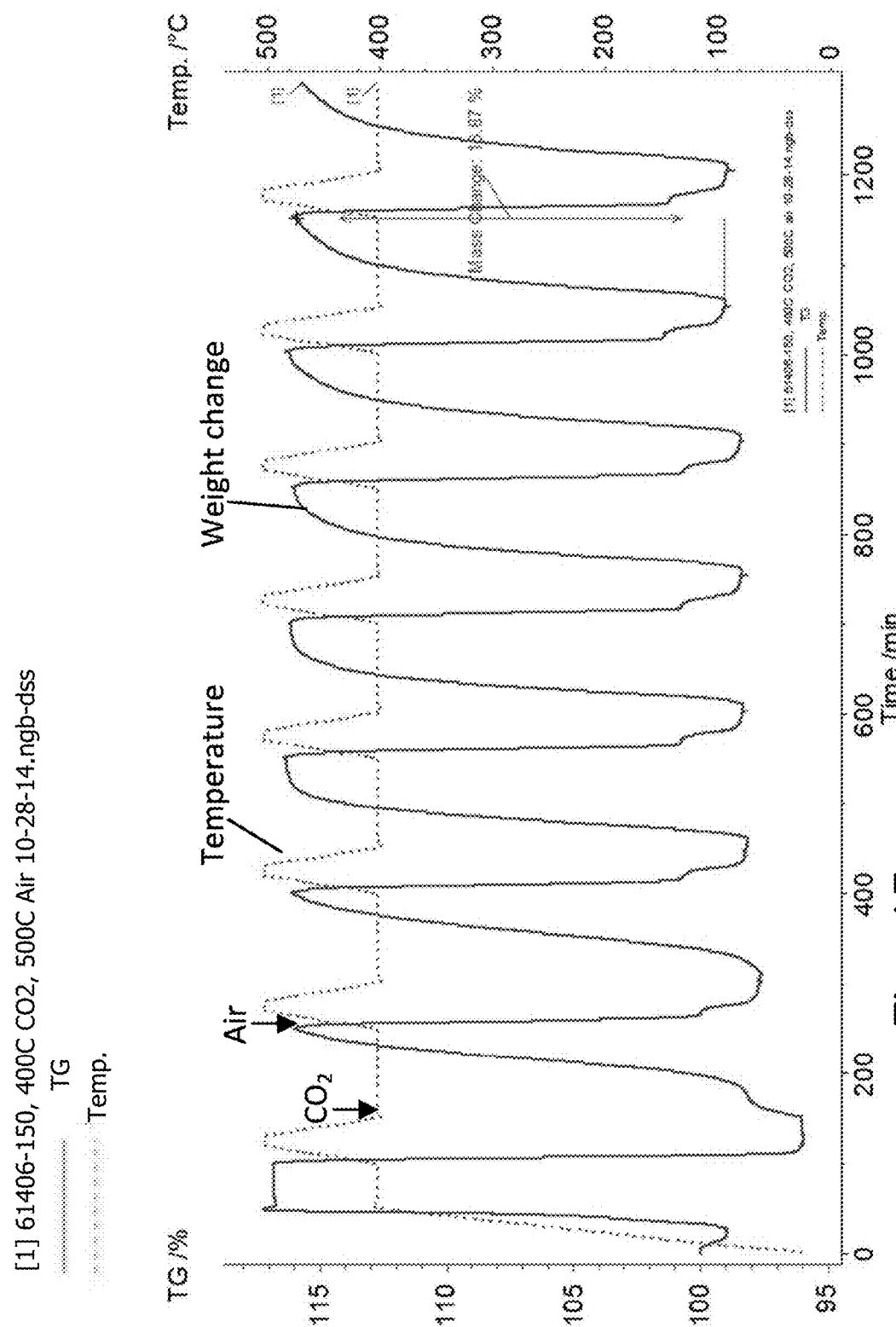
FIG. 13 TGA testing results of a composite sorbent comprising MgO+Na2CO3+LiNaKCO3 (sorption: 400° C., $CO_2$, 99 min; regeneration: 500° C., air, 51 min) Red line=Temperature profile, Green line=weight change.

Performance characteristics of a different composite sorbent are shown in FIG. 13. This sorbent comprises 44 wt % MgO as an active phase, 44 wt % $Na_2CO_3$ as an inert phase, and 12 wt % $LiNaKCO_3$ as the promoting phase. Since $MgCO_3$ decomposes at much lower temperature than CaCO3, this sorbent can be quickly regenerated at 500° C. or below. A stable 18.9 wt % working capacity was shown through 8 sorption/regeneration cycles.

The experimental results conducted this quarter for $CO_2$ sorbents are summarized in table 4. The sorbents that work at sorption temperatures 400° C. with regeneration temperature<600° C. are identified. More experiments are being conducted to find the sorbents with sorption temperatures from 400 to 550° C.

TABLE 4

CO$_2$ working capacity of sorbents with and without the eutectic LiNaK-carbonate promoter

| Sorbent material | Initial sorption capacity (wt. %) (sorption/regeneration temperature) | | Cyclic sorption capacity of the sorbent containing promoter (sorption/regeneration temperature) | | |
|---|---|---|---|---|---|
| | Without promoter | With some promoter | 360° C./450° C. | 400° C./500° C. | 500° C./750° C. |
| MgO | <2% (330-385° C.) | ~50% (330-385° C.) | 60% in first cycle, <1% in 2-8 cycle | T too high for sorption | |
| MgO—Na$_2$CO$_3$ | 7-8% (350-400° C./400-500° C.) | 18-20% (350-400° C./400-500 C. ° C.) | Stabilized at 15% | Stabilized at 15% | T too high for adsorption |
| CaO | 25% (500-600° C./>680° C.), slow kinetics | 25% (300-450° C./>680° C.), fast kinetics | T too low for regeneration | | unstable |
| Decomposed dolomite | 12% (500-600° C./>680° C.), slow, kinetics | 25% (350-400° C./400° C.-680° C.), fast kinetics | Stable 5-8% | 20% in first cycle, <1% in 2-8 cycle | 25% |

To confirm performances of the composite sorbent design, a larger number of sorption/regeneration cycling tests were performed with two dolomite sorbents of different promoter loading levels. The sorption was conducted at 550° C. in 100% $CO_2$ and regeneration was performed at 700° C. in $N_2$.

Figure 14:
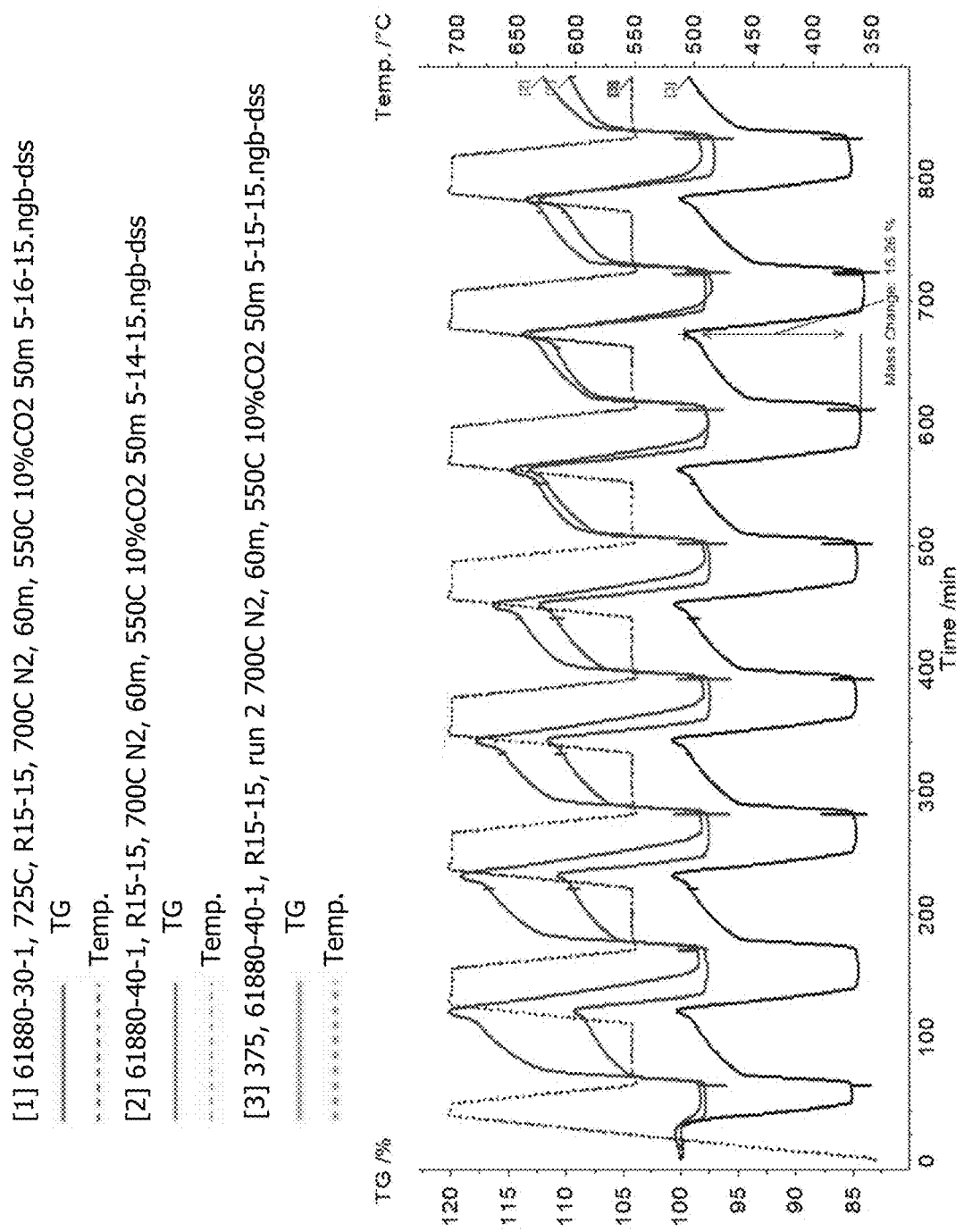
FIG. 14 Multiple cycling tests of dolomite-based composite sorbents with two different promoter loading levels (sorption at 550° C. in 10% $CO_2$; dashed line=temperature profile; red line denoted as [2]=sorbent #1 1-8 cycles; blue line denoted as [3]=sorbent #1 9-16 cycles; green line denoted as [1]=sorbent #2 1-8 cycles).

Sorbent #1 loaded with 5 wt. % promoter was tested for 16 cycles. Sorbent #2 loaded with 10 wt. % promoter was tested for 8 cycles. The results are plotted in FIG. 14. For the sorbent #1, the weight change due to $CO_2$ sorption is low initially, but increases to 14.8 wt. % after $8^{th}$ cycle and is stabilized at this level in the subsequent cycling tests. The sorbent #2 provides 19.9 wt. % initial $CO_2$ uptake but its $CO_2$ sorption weight gain declines to 11.8% after 8 cycles.

starting material, calcination temperature, and promoter loading. A working sorbent structure is formed through repeated sorption/regeneration test cycles. The promoter is used as an additive to decorate the solid surface and intended not to exist as a separate phase. Thus, its excessive loading is not necessary or may become a negative factor by blocking accessibility of $CO_2$ into the sorbent pores.

TABLE 5

Effects of composite sorbent preparation on $CO_2$ sorption performances (TGA test conditions: Sorption 550° C. 10% $CO_2$/regeneration condition 700° C. $N_2$)

| Sorbent No | Starting material | Promoter addition level | Calcination temp | Sorption/regeneration cycle # | $CO_2$ working capacity normalized, wt. % |
|---|---|---|---|---|---|
| Effect of starting dolomite materials ||||||
| 1 | As-received | 5 wt % | 725° C. | 1st→$8^{th}$→$16^{th}$ | 19.4→28.3→28.3 |
| 2 | 850° C.-calcined | | | 1st→$8^{th}$ | 37.5→17.7 |
| 3 | As-received | 10 wt % | 725° C. | 1st→$8^{th}$ | 38.0→22.7 |
| 4 | 850° C.-calcined | | | 1st→$8^{th}$ | 34.6→18.0 |
| 5 | As-received | 10 wt % | 350° C. | 1st→$8^{th}$ | 23.3→20.5 |
| 6 | 850° C.-calcined | | | 1st→$8^{th}$ | 27.2→21.5 |
| Effect of promoter addition level ||||||
| 1 | As-received | 5 wt % | 725° C. | 1st→$8^{th}$→$16^{th}$ | 19.4→28.3→28.3 |
| 3 | | 10 wt % | | 1st→$8^{th}$ | 38.0→22.7 |
| 2 | 850° C.-calcined | 5 wt % | 725° C. | 1st→$8^{th}$ | 37.5→17.7 |
| 4 | | 10 wt % | | 1st→$8^{th}$ | 34.6→18.0 |
| 7 | 850° C.-calcined | 5 wt % | 350° C. | 1st→$8^{th}$ | 29.7→17.0 |
| 6 | | 10 wt % | | 1st→$8^{th}$ | 27.2→21.5 |
| Effect of composite calcination temperature ||||||
| 3 | As-received | 10 wt % | 725° C. | 1st→$8^{th}$ | 38.0→22.7 |
| 5 | | | 350° C. | 1st→$8^{th}$ | 23.3→20.5 |
| 4 | 850° C.-calcined | 10 wt % | 725° C. | 1st→$8^{th}$ | 34.6→18.0 |
| 6 | | | 350° C. | 1st→$8^{th}$ | 27.2→21.5 |
| 2 | 850° C.-calcined | 5 wt % | 725° C. | 1st→$8^{th}$ | 37.5→17.7 |
| 7 | | | 350° C. | 1st→$8^{th}$ | 29.7→17.0 |

Thus, 5 wt. % addition of the promoter looks sufficient and excessive addition may not have any benefit.

TGA screening tests revealed strong synergism of the promoted dolomite sorbent. Impacts of the sorbent preparation on its cyclic performances were studied. The results are summarized in table 5. The dolomite can be used as received or pre-calcined at 850° C. in air for hours. The 850° C.-calcination converts the carbonate into Mg and Ca oxides. Addition of the promoter into the dolomite was evaluated at two different loading levels (5 wt. %, 10 wt. %). The resulting dry mixtures were calcined at two different temperatures (350, 725° C.) prior to TGA tests. Comparative pairs of sorbents #1 vs. 2, 3 vs. 4, and 5 vs. 6 show the impact of dolomite starting materials on the $CO_2$ working capacity at the same promoter loading level and at the same calcination temperature. The $CO_2$ sorption capacity as-measured with the as-received dolomite is normalized on the basis of MgO+CaO content, i.e., on the same basis as the sorbent derived from the calcined dolomite. No obvious advantage can be seen by using the pre-calcined dolomite. Comparative pairs, sorbent 1 vs. 3, 2 vs. 4, and 7 vs. 6, show no obvious advantage by increasing the promoter loading from 5 to 10 wt. % with the same starting material and same calcination temperature. Comparative pairs of sorbents 3 vs. 5, 4 vs. 6, and 2 vs. 7 reveal the impact of the composite sorbent calcination temperature with the same dolomite precursor and same promoter loading level. 725° C.-calcination does not show any significant difference from 350° C.-calcination. This group of experiments indicates that the composite sorbent preparation is not so sensitive to the Example III. Packed Bed CO2 Sorption/Regeneration Tests of Composite Sorbents A packed bed sorption test was conducted on a tube tubular reactor (316 stainless steel, 0.5" OD, 0.049" wall thickness). The sorbent particles of 40-100 mesh were loaded into the reactor tube by tapping the reactor wall. The resulting packing density was about 0.6 g/cc. The sorbent bed was held by quartz wool on the top and bottom. The gas flow was directed downward through the sorbent bed. Individual gas flow rates were controlled by mass flow controllers (MKS Instruments model 1179A and 1479A), while water flow rate was controlled by HPLC pump (Cole Parmer model DigiSense 89000). The bed temperature was controlled by the furnace heating. The sorbent bed was heated to 700° C. in 0.5 liter/min air to activate prior to lowering to designated sorption temperatures. The water was preheated to vaporize at 150° C. prior to entering the reactor. The reactor effluent was cooled down to 4° C. to condense the majority of the entrained water vapor. The residual gas was analyzed by a quadruple mass spectrometer (Kurt J. Lesker model Quad 200). Typically, 0.5 liter/min dry gas consisting of 33% $CO_2$ and 67% $H_2$ was used to simulate the reforming gas.

Figure 15B:
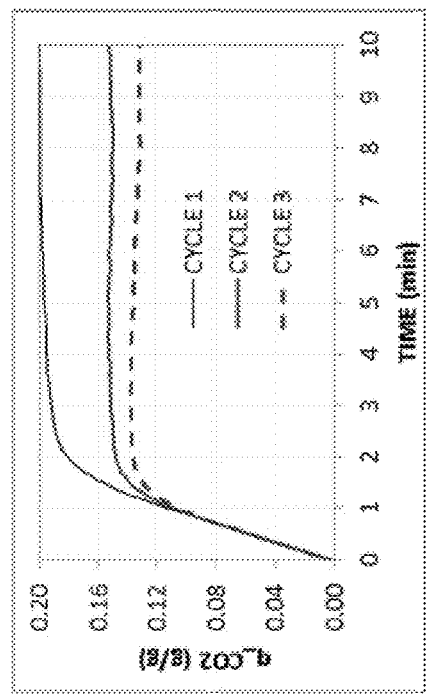
FIGS. 15A-15D show $CO_2$ sorption breakthrough curves with different $H_2O$/steam ratio in the feed gas (GHSV=5,800 v/v/h on dry gas basis @ standard gas conditions) a). Breakthrough curve ($H_2O$/dry gas=0); (b). $CO_2$ loading ($H_2O$/dry gas=0); (c). $CO_2$ loading ($H_2O$/dry gas=0.25); (d). $CO_2$ loading ($H_2O$/dry gas=1.0).
Figure 15D:
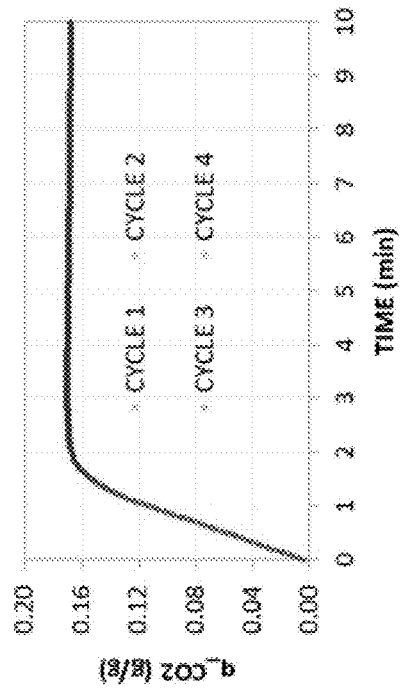
Figure 15A:
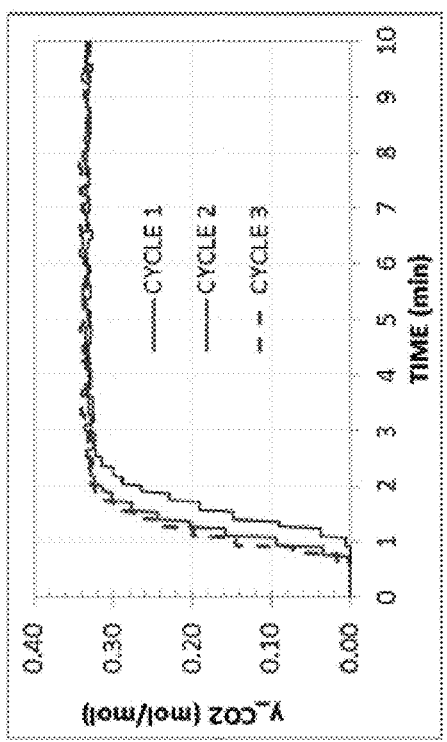
Figure 15C:
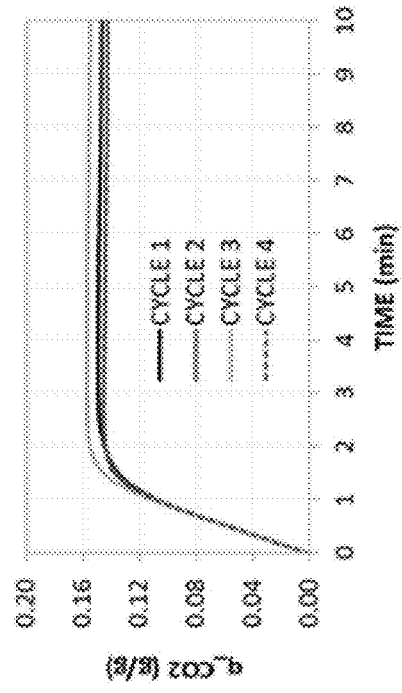
Figure 17A:
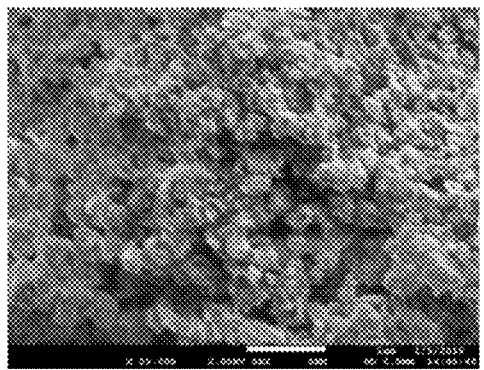
FIGS. 17A-17D show micro-structures of fresh and used composite sorbents (A). as-prepared with 350° C. pre-calcination; (B). as-prepared with 725° C. pre-calcination; (C). Spent sorbent from run 6-12; (D). Spent sorbent from run 7-31.
Figure 17B:
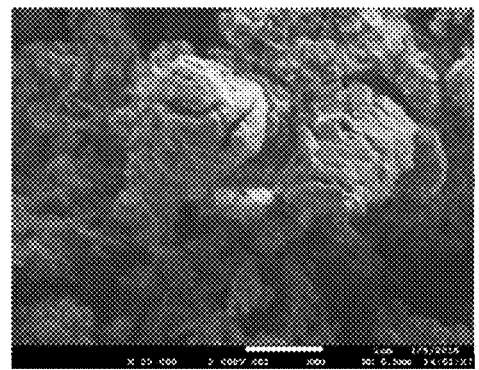
Figure 17C:
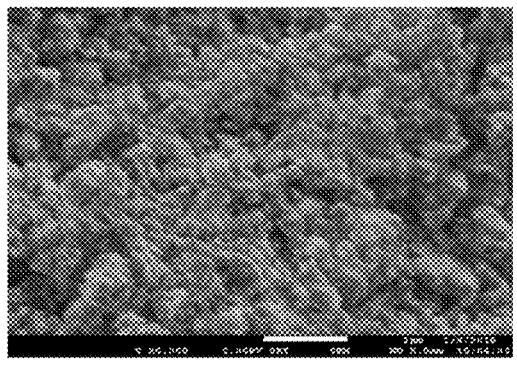
Figure 17D:
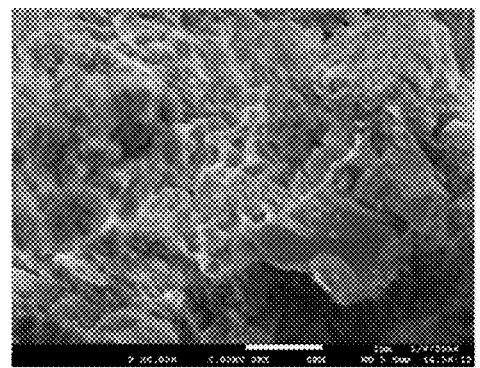

To elucidate effects of sorption conditions on the sorbent performances, we conducted packed bed tests with the sorbent #1. FIG. 15a shows $CO_2$ breakthrough curves with dry gas of $H_2/CO_2$=2/1. $CO_2$ loading is calculated by integrating the sorption breakthrough curves (FIG. 15b). The sorption capacity tends to decrease in three consecutive cycling. The sorbent cycling stability is substantially enhanced by addition of $H_2O$ into the feed gas. The four sorption curves with $H_2O$/dry gas=0.25 converge quickly (FIG. 15c). With $H_2O$/dry gas=1.0, the $CO_2$ sorption curves for 4 cycles completely overlap (FIG. 15d). The positive effect of steam on the sorbent stability is clearly demonstrated. The sorbent appears to be more stable in the presence of steam. Such performance characteristics are highly desirable for $CO_2$ capture under reforming conditions and for most practical applications, since the presence of steam is ubiquitous.

The present composite sorbent exhibits very rapid sorption kinetics. The $CO_2$ sorption on the packed bed is nearly completed within 2 min for all the runs. It is estimated from the sorption breakthrough curve that the first order $CO_2$ sorption rate constant is about 9.4 l/s for the un-saturated sorbent and about 4.0 l/s for the 95% saturated. The rapid sorption is necessary to reduce the reactor size and to combine the $CO_2$ sorption with steam reforming reactions in situ. The $CO_2$ sorption rate obtained in this work is comparable to $CO_2$ adsorption into porous adsorbents. The former is a gas/solid carbonation reaction process, while the latter is mostly a physical adsorption process. The rapid sorption kinetics is attributed to catalyzing functions of the promoter. CaO has a higher density than $CaCO_3$. It is known that solid diffusion often is a rate-limiting step for carbonation reactions. The liquid-phase promoter and presence of $H_2O$ may help breakup of CaO crystals into highly-porous structures for rapid $CO_2$ diffusion and reaction.

The same sorbent bed was tested under various conditions over a period of 17 days, while the regeneration conditions were kept the same (700° C. in air). It was noticed that the $CO_2$ sorption capacity increased with the time as shown in FIG. 16a. During a 17-day testing period, the sorbent was tested at different sorption temperatures (400 to 650° C.), different $H_2O$/dry gas ratios (0 to 1), and different reactor pressures (1 to 3 bars). Under these testing conditions, $CO_2$ sorption for the CaO material is not limited by thermodynamic equilibrium. The $CO_2$ sorption capacity is mainly determined by the active phase available for reversible carbonation reaction. This is evidenced by the $CO_2$ sorption capacities measured at different temperatures (FIG. 16b). These results indicate that it may take a long time for a sorbent to establish a fully-activated working state. Rather than having a durable, permanent porous sorbent structure, the present composite sorbent realizes long-term, dynamic stability through reversible conversion of the sorbent between the carbonated and de-carbonated states. Such a conversion process is facilitated by the presence of promoter and steam. This synergistic sorbent design concept may be applied to other materials.

Example IV. Micro-Structures of the Composite Sorbent of Present Invention

The dolomite sorbents prepared and tested in the previous examples were analyzed by electron scanning electromicroscopy (SEM) to check the micro-structures and compositions. As shown by SEM pictures in FIG. 17, all the four samples have a porous structures with grains or dense crystals less than 1.0 μm. Table 6 lists the sorbent compositions of two fresh sorbents and two spent sorbents. It is noted that the sorbent was made by ball-milling of decomposed dolomite and eutectic LiNaK-carbonate. Li could not be measured by SEM probe. As expected, Mg, Ca, Na, and K are the dominating metal elements in these sorbents. Ca/Mg atomic ratio is close to stoichiometric Ca/Mg ratio (1:1) in the dolomite. Ratios of Na and K to Mg are all less than 0.20, because they are minor constituents as a promoting element.

TABLE 6

Atomic compositions of dolomite composite sorbents of present invention

| Atomic ratio of metal element to Mg | As-prepared (fresh) | | Tested in the packed bed | |
|---|---|---|---|---|
| | Calcined at 350° C. | Calcined at 725° C. | Run 6-12 | Run 7-31 |
| Mg | 1.00 | 1.00 | 1.00 | 1.00 |
| Ca | 0.87 | 1.04 | 1.11 | 1.11 |
| Na | 0.11 | 0.17 | 0.09 | 0.09 |
| K | 0.06 | 0.12 | 0.06 | 0.06 |

Figure 19:
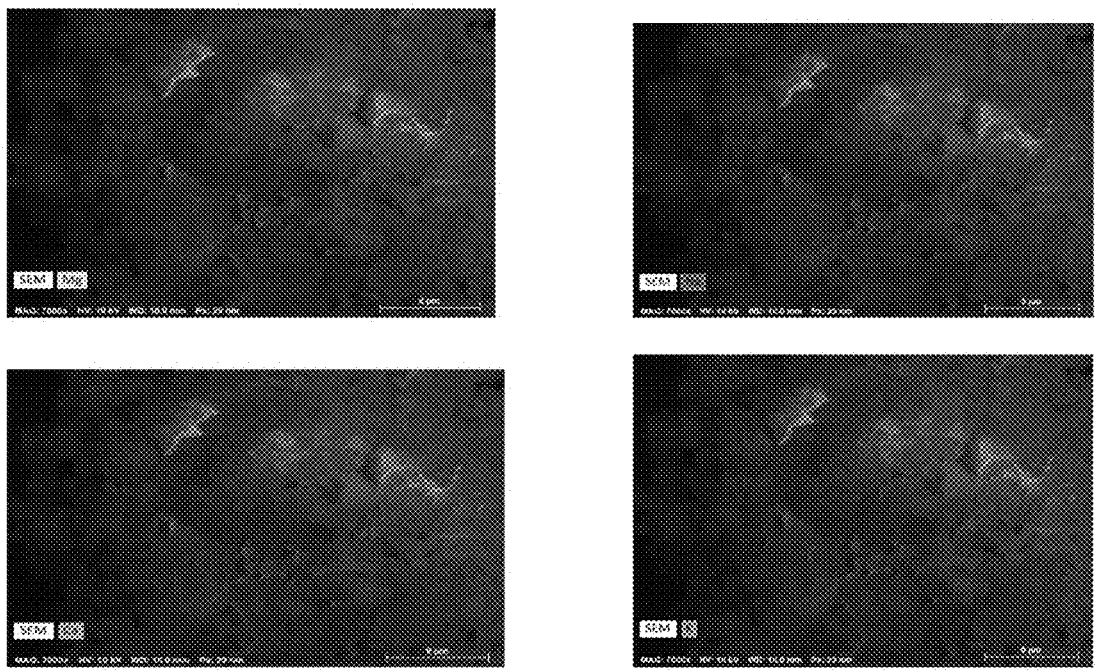
FIG. 19 Elemental mapping of spent composite sorbent from run 6-12.
Figure 20:
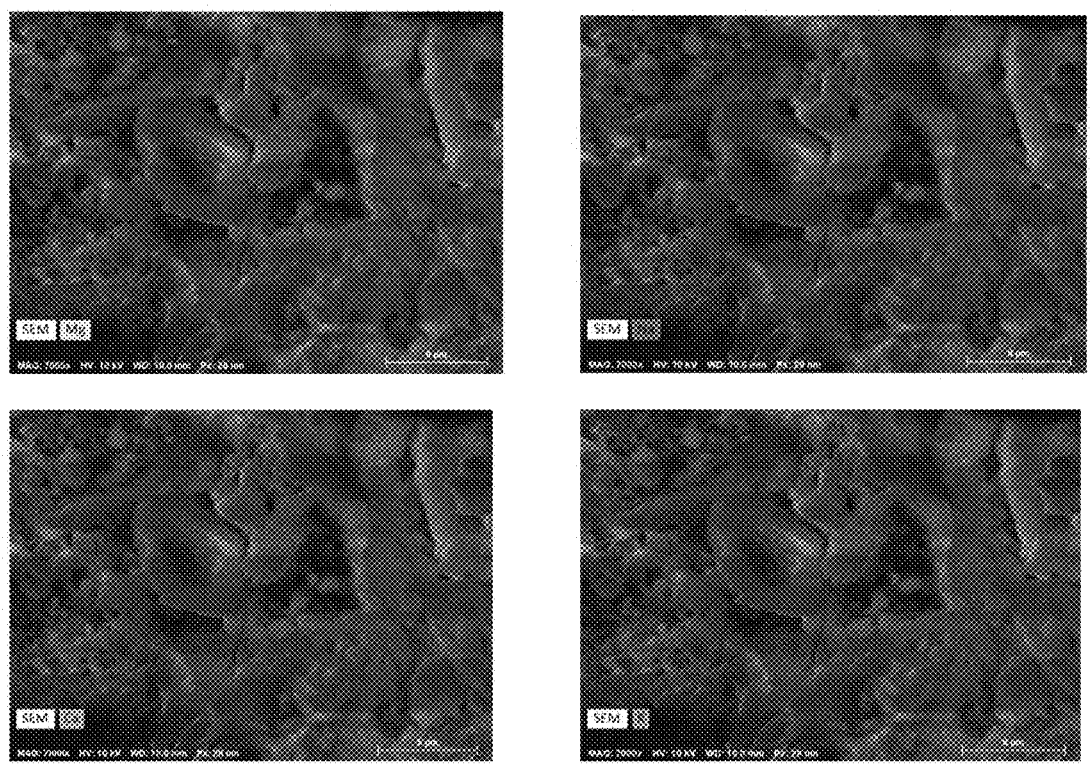
FIG. 20 Elemental mapping of spent composite sorbent from run 7-31.

In addition to atomic compositions, the elemental distribution is very important to obtain the synergistic effects of the composite sorbent. Elemental mapping was conducted during SEM analysis. Maps of Mg, Ca, Na and K elements for one fresh and two spent sorbents are presented in FIGS. 18-20, respectively. Uniform distribution of Mg, Ca, Na, and K is shown by the three samples. The spent sorbent from run 6-12 was unloaded from the reactor after 18 cycles of repeated sorption/regeneration tests, sorption at 500° C. and regeneration at 700° C. The spent sorbent from run 7-31 was tested over a temperature range of 300 to 700° C. in a 17-day testing period of time. Those two sorbents did not show any apparent deactivation during testing. The SEM elemental mapping confirms that an active sorbent is associated with uniform elemental distribution.

Figure 21:
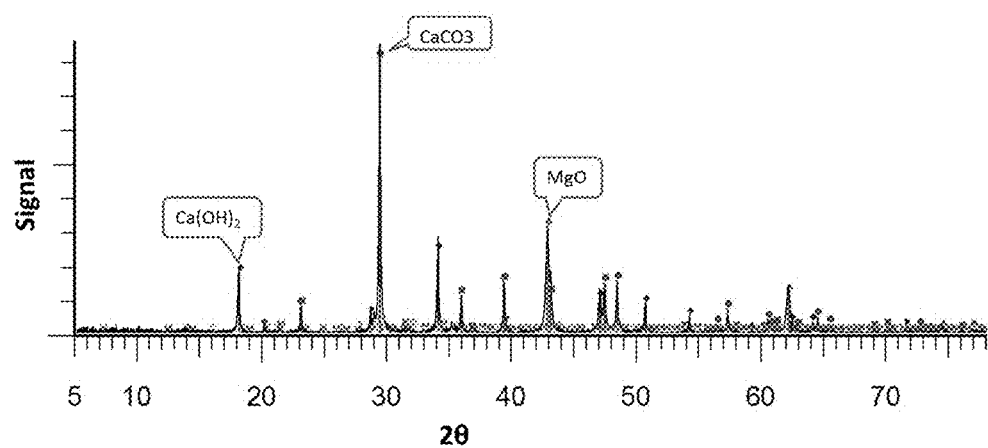
FIG. 21 XRD patterns of dolomite composite sorbent containing 5 wt % eutectic LiNaK-carbonate (pre-calcined at 350° C.) before testing. Red filled square=CaCO3 phase, Blue filled diamond=Ca(OH)2 phase, pink filled triangle=MgO phase.
Figure 22:
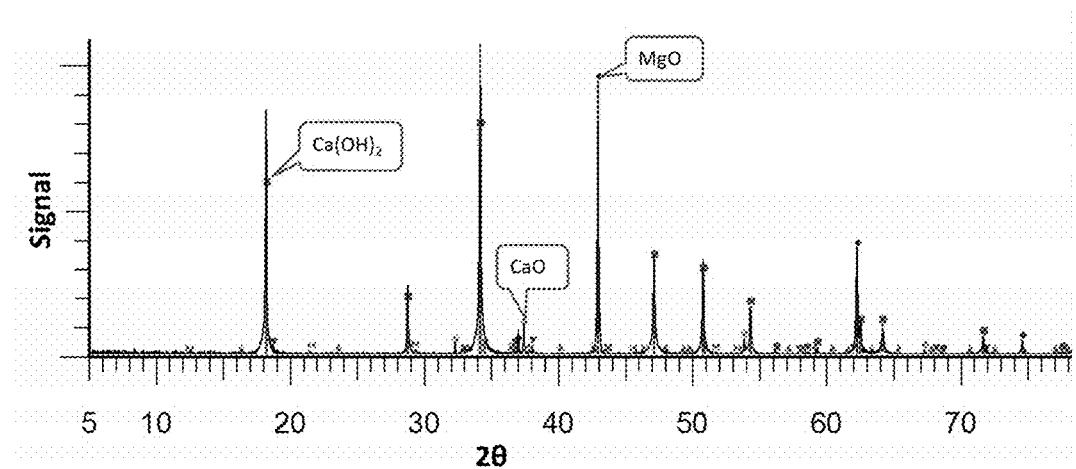
FIG. 22 XRD patterns of the dolomite composite sorbent after parametric CO2 sorption tests (activated state). Red filled square=Ca(OH)2 phase, Blue filled diamond=MgO phase, green filled diamond=CaO phase.
Figure 23:
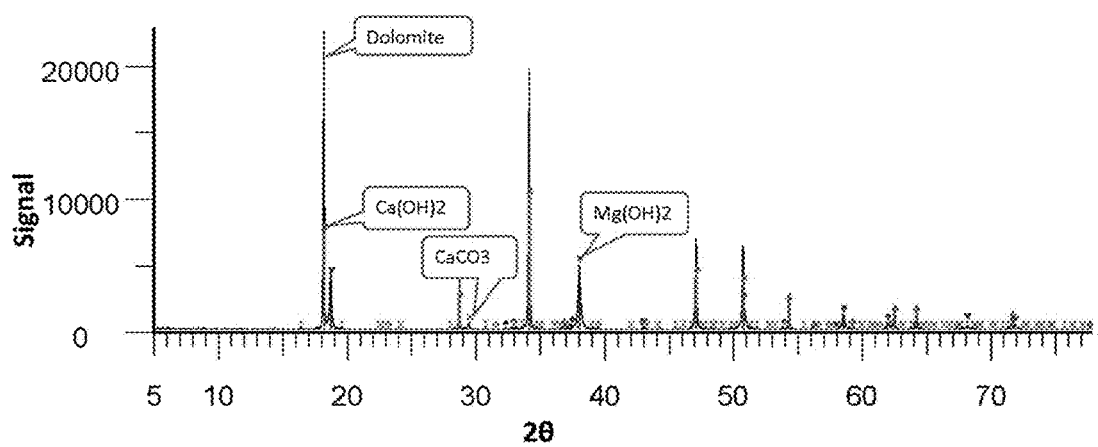
FIG. 23 XRD patterns of the dolomite composite deactivated after CO2 sorption tests (sorbent exposed to liquid water). Black line=Dolomite, pink filled triangle (up)=Ca(OH)2, orange filled triangle (down)=Mg(OH)2, green filled circle=CaCO3 phase

The crystal phases of the composite sorbent were measured by X-ray diffraction (XRD). FIGS. 21-23 show XRD peaks for the fresh, activated, and deactivated dolomite composite sorbents, respectively. The sorbent was prepared by incorporating 5 wt % eutectic LiNaK-carbonate into the decomposed dolomite. The major crystal phases in the as-prepared sorbent (FIG. 21) are MgO, CaCO3, and Ca(OH)2. MgCO3 in the dolomite was completely decomposed into MgO, while CaCO3 was partially decomposed into CaO. $Ca(OH)_2$ could be formed from hydration of CaO by moisture in ambient air. LiNaK-carbonate could not be detected by XRD because it presents in small quantities and is well dispersed in the composite.

After the sorbent was tested under various conditions and unloaded from a fully-activated state, MgO crystal phase was intact (FIG. 22) because MgO served as a structural stabilizer of the composite sorbent under the present testing conditions. Ca(OH)2 and CaO in the activated sorbent are the active phase for CO2 sorption, which is expected. By contrast, metal oxide phases disappeared while the dolomite crystal phase emerged in a deactivated sorbent (FIG. 23). The composite sorbent was accidently deactivated due to condensation of liquid water in during CO2 sorption in the packed bed tests. The liquid water leached out all the eutectic carbonate from the composite sorbent so that the deactivated sorbent could not be regenerated at 700° C., which was the regeneration temperature during parametric and cyclic tests.

Example V. Comparative Example of Dolomite-Based Sorbent

This example shows that sorbents without a sufficient amount of eutectic carbonate promoter is not active for CO2 sorption. Dolomite from City Chemical was calcined at 850°

C. for 4 hours in air. 90 g of 850° C. calcined dolomite (MgO—CaO) was mixed with 3.22 g of Li2CO3 (99%, Sigma Aldrich), 3.33 g of Na2CO3 (99%, Sigma Aldrich) and 3.45 g of K2CO3 (99%). The solid mixtures were added into a 500 ml Nalgene plastic bottle and mixed with 250 g of 2-propanol (EMD Chemicals, Canada) and 500 g of zirconia beads (diameter: 0.3-1 cm). The bottle was rotated for 18-96 hours at a speed of 150-200 rpm. The obtained slurry was dried at RT ° C. in plates to evaporate 2-propanol and form 0.2-0.5 mm thick cake. The cake was crushed and dried at 120 C. Then the sieved particles (<100 mesh) were calcined 725° C. for 3 hours in air.

Both dried and pre-calcined sorbent particles were tested for CO2 sorption in the packed bed at 500° C. sorption temperature in CO2 and 725° C. regeneration in air. The sorbents showed initial CO2 sorption activity but quickly de-activated in the subsequent test cycles. The samples were analyzed to understand the problem. The atomic compositions of as-prepared and tested sorbents are listed in the Table 7 below.

TABLE 7

Dolomite-based composite sorbents containing in-sufficient promoter

| Atomic ratio of metal element to Mg | As-prepared | | Tested in the packed bed 500° C./725° C. |
|---|---|---|---|
| | Dried at 120° C. | Pre-calcined | |
| Mg | 1.00 | 1.00 | 1.00 |
| Ca | 1.04 | 0.73 | 0.38 |
| Na | 0.07 | 0.03 | 0.02 |
| K | 0.05 | 0.02 | 0.02 |

Figure 18:
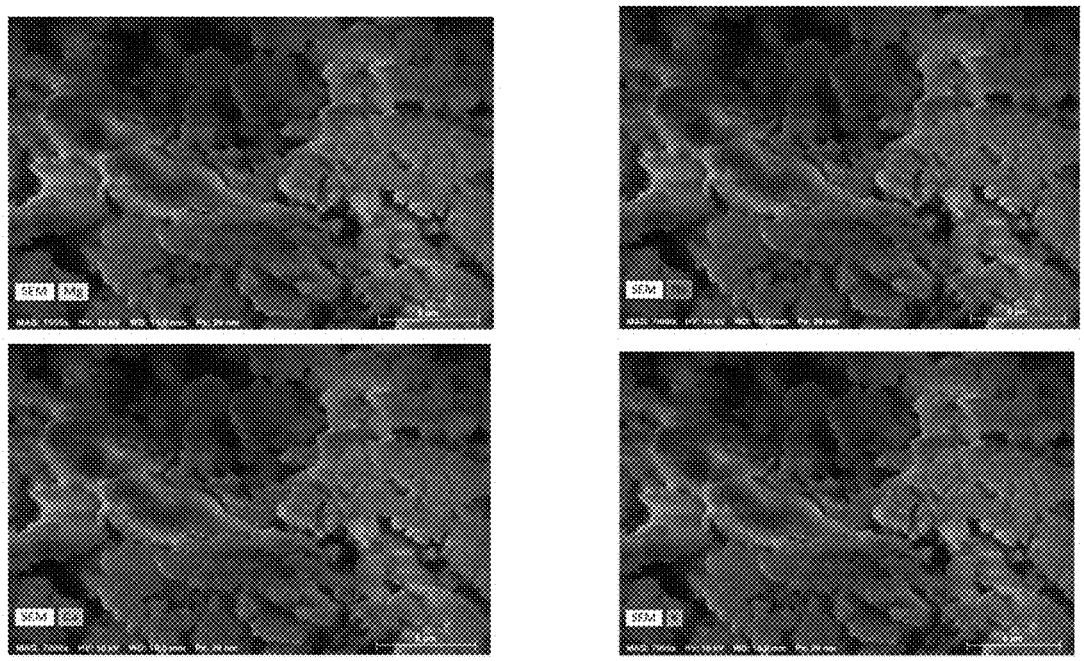
FIG. 18 Elemental mapping of as-prepared composite sorbent with 350° C. pre-calcination.

Small grains and porous structures (FIG. 17) are shown by the samples after drying, pre-calcination, and testing. However, Na and K content were drastically reduced after the sample was pre-calcined and tested. It is noted that Li could not be analyzed by SEM. Compared to the active, stable sorbent shown in the previous example, the sorbent prepared in this example has low Na and K content after testing. Elemental maps of Mg, Ca, K, and Na are shown in FIG. 18 indicating that even though the dried sample has certain amounts of Na and K, there is segregation of Na and K. To form a eutectic phase, Na and K carbonates need to exist together. The Na and K content in the pre-calcined and tested samples are too low to be clearly mapped in FIGS. 19 and 20.

This example confirms the necessity to have an eutectic carbonate phase be uniformly distributed in an active composite sorbent with adequate amounts, such as, K and Na ratios to Mg greater than 0.020.

Example VI. Loading of Active Sorbents into Monolith Structures

Figure 24A:
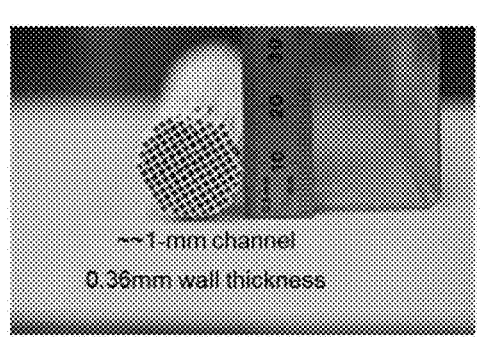
FIGS. 24A-24B show $TiO_2$ monolith used to load the sorbent of present invention.
Figure 24B:
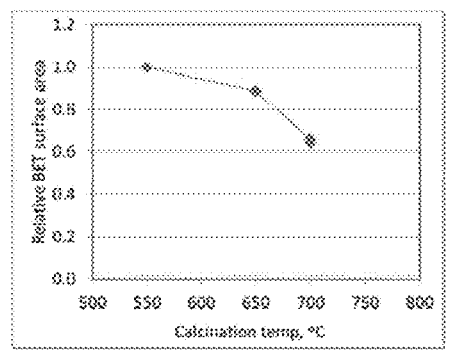
Figure 25A:
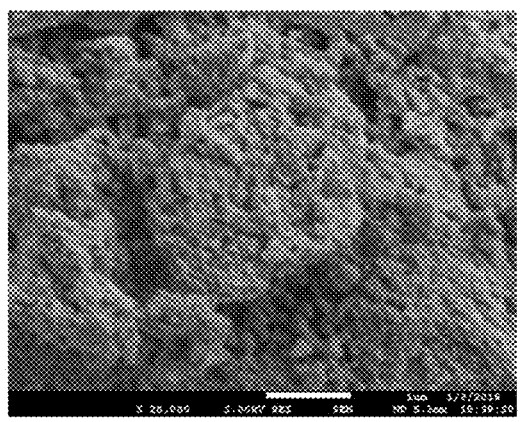
FIGS. 25A-25D show microstructures of the NiCu—MgCe—Al oxide composite catalyst particle.
Figure 25B:
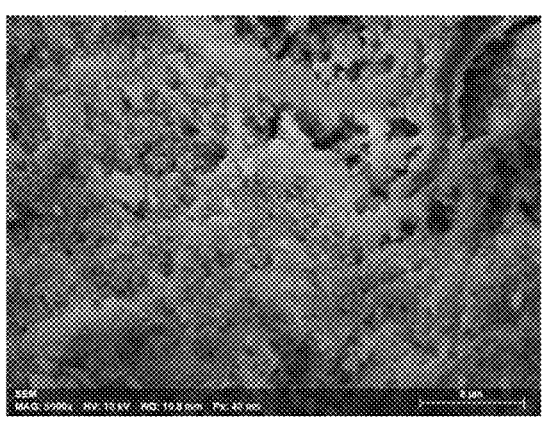
Figure 25C:
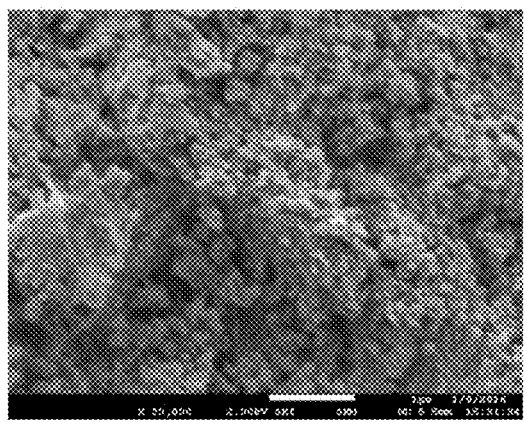
Figure 25D:
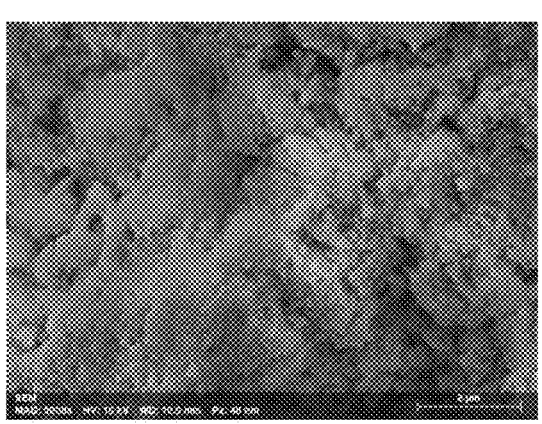

A TiO2 monolith (Cormetech, NC) was used to make the monolith-structured sorption bed. As shown in FIG. 24a, a monolith block with about 1 mm square channels and 0.36 mm wall thickness was core-drilled into pieces of 20 mm diameter for experimental purposes. This monolith has meso-porous wall structures to hold the sorbent particle and allow gases diffuse across. The monolith surface area decreased with increasing calcination temperature (FIG. 24b). The monolith maintains mechanical integrity and porous structures after various hydrothermal treatment. Several techniques were evaluated to load the sorbent particles into the monolith channels, which includes filtration of sorbent slurry through the channel wall, precipitation of the sorbent particles from into the channel from slurry, and dry powder packing. The dry powder packing was found to be a simple, effective method. The procedures are described in the following.

First, alternative rows of channels on the bottom monolith were plugged by cement to hold the sorbent powder. Then, adjacent rows of the channels on the bottom monolith were plugged by cement to prevent the sorbent powder from filling all the channels. The dolomite sorbent was crushed and sieved to the sizes well below the channel opening (1.0 mm), such as 300 μm. The pugged cement was held inside a tube that was mounted onto a vibrator or shaker in vertical orientation. The sorbent powder was poured onto top of the monolith, while the tube was shaken or vibrated. The powder may be added gradually as the channels were being filled. Filling was stopped after the channel was full.

Nine pieces of the monoliths were filled with the composite sorbent powder and associated weight gains are listed in the Table 8 below. The average packing density of the sorbent powder inside the channel is 0.68 g/cc with standard deviation of 0.105 g/cc by assuming 1.0 mm channel width and 0.5 cm plugged channel length.

TABLE 8

Loading of CO2 sorbent powder into TiO2 monolith by dry powder packing

| Monolith ID 60195 | Length cm | # of channels filled | Monolith sample weight, g | Wt. % change | Packing density, g/cc |
|---|---|---|---|---|---|
| 129-1 | 6.0 | 48 | 8.360 | 21.2 | 0.67 |
| 129-2 | 5.7 | 57 | 8.550 | 24.2 | 0.70 |
| 129-3 | 5.5 | 53 | 7.680 | 16.3 | 0.48 |
| 129-4 | 5.3 | 53 | 7.850 | 22.1 | 0.68 |
| 129-5 | 5.3 | 53 | 8.100 | 17.5 | 0.56 |
| 129-6 | 5.2 | 60 | 7.690 | 28.5 | 0.78 |
| 129-7 | 5.2 | 54 | 7.351 | 23.1 | 0.67 |
| 129-8 | 5.0 | 54 | 7.063 | 25.8 | 0.75 |
| 129-9 | 4.9 | 54 | 6.693 | 28.9 | 0.81 |

Example VII. Composite Catalyst Preparation

The NiCuMgCeCeAl—O metal oxide composite catalysts were first prepared as particles to characterize their properties. The nitrate salts used in the preparation were Ni(NO3)2.6H2O 100.0%, Cu(NO3)2.2.5H2O 98%, Mg(NO3)2.6H2O 99%, Ce(NO3)3.6H2O 99%, and Al(NO3)3.9H2O 98%. The nitrate salts were weighed according to required stoichiometric ratios and mixed. De-ionized water was added to obtain a clear solution. Then, a mixture of NaOH (0.88 mmol/g) and Na2CO3 (0.88 mol/g)

solution was prepared. The mixed metal nitrates solution was heated in a water bath on a hot plate to 75-80° C., the NaOH/Na2CO3 solution was added drop-wise with stirring to pH=9-10. The temperature was controlled at 75-79° C. For sample 61880-49, about 89 g of NaOH (0.88 mmol/g)/Na2CO3 (0.88 mol/g) solution was added to 85.5 g of metal nitrates solution in 20 min. The mixture was stirred for 1 hr at 75-78 C for 1 hr. The solution compositions used for preparation of the composite catalysts are summarized in table 9. The precipitate was aged for 10 h at RT, centrifuged and washed with DI water for 4 times until pH=7. The precipitate was dried overnight at 40-50° C. and then 120 C for 28 hr. The dried precipitates was heated at 1° C./min to 500° C. and held at 500° C. for 6 h in air.

The BET surface areas and pore sizes of four composite catalysts are listed in Table 10. The first four samples were prepared in the same batch at about 10 g scale. BET surface area and pore volume decreased with increasing Al content in the composite, while the pore size increased. The Ni:Cu:Mg:Ce:Al=1:0.2:0.1:1:2 formulation was chosen for parametric studies of the preparation process. A larger batch of the particle (100 g scale) was prepared using this formulation with quick precipitation and 2 times of water washing. With the sample calcination condition, the resulting catalyst has BET surface area of 140 m2/g, slightly less than the small-scale trial. The catalyst was further calcined at 725° C. for 6 hours.

TABLE 9

Solution concentrations used for preparation of NiCuMgCeCeAl—O composite catalyst particle

| Catalyst # | Atomic ratio of metal elements in solution | | | | | Metal-NO3 solution conc. mmol/g | | | | |
|---|---|---|---|---|---|---|---|---|---|---|
| | Ni | Cu | Mg | Ce | Al | Ni | Cu | Mg | Ce | Al |
| 61880-35 | 1 | 0.2 | 0.35 | 0.2 | 1.8 | 0.341 | 0.068 | 0.119 | 0.068 | 0.613 |
| 61880-49 | 1 | 0.2 | 0.1 | 1 | 2 | 0.190 | 0.038 | 0.019 | 0.190 | 0.380 |
| 61880-53 | 1 | 0.2 | 0.1 | 1 | 1 | 0.184 | 0.037 | 0.018 | 0.184 | 0.184 |
| 61880-55 | 1 | 0.2 | 0.1 | 1 | 0 | 0.229 | 0.046 | 0.023 | 0.229 | 0.000 |
| 61880-70- | 1 | 0.2 | 0.1 | 1 | 2 | 0.324 | 0.065 | 0.032 | 0.324 | 0.647 |
| 61880-70 725° C. | | | | | | | | | | |

TABLE 10

BET surface area and pore size of prepared NiCuMgCeCeAl—O composite catalyst

| Catalyst # | Surface area m2/g | Pore Volume cc/g | Pore Size, A Ad/De |
|---|---|---|---|
| 61880-35 | 238.5 | 0.46 | 60/40 |
| 61880-49 | 163.0 | 0.43 | 65/50 |
| 61880-53 | 91.5 | 0.33 | 95/65 |
| 61880-55 | 39.8 | 0.17 | 200/100 |
| 61880-70- | 140.1 | 0.25 | 65/50 |
| 61880-70 725° C. | 76.1 | 0.2 | 95/80 |

Example VIIII. Preparation of Composite Reforming Catalysts in Monolith Structures The same $TiO_2$ monolith as used in the previous sorbent loading was used to make the monolithic reforming catalyst by impregnation. Table 11 lists the four solutions used for impregnation. The impregnation solution was prepared using the same metal precursors as used in the above example. The preparation procedure is described in the following. The 2-cm $TiO_2$ monolith was fully immersed in the solution at room temperature (20° C.) and soaked a few minutes under vacuum until no gas bubbles emerged out of the solution. The monolith was taken out of the solution. The excessive solution was drained first and then spins out by centrifugation. The wet sample was left in the fume hood to dry overnight and further dried in an oven at 120° C. The dried sample was calcined at 500° C. for 6 h with 1° C./min ramp rate in air. The impregnation was repeated to increase the catalyst loading.

After the calcination, the monolith body was cut open to expose the interior channels. All the channels looked uniform in color and were of any slid deposit on the channel wall. Thus, the metal oxide reforming catalyst was deposited into the $TiO_2$ support pores. The monolith was crushed into particles for BET surface area and pore volume measurements. The BET surface area and pore volume decreased with increasing the catalyst loading. This is explained by increased occupancy of the pores on the monolith channel by the catalyst.

TABLE 11

Preparation of monolith reforming catalysts by impregnation

| Catalyst ID | Catalyst name | metal ratio | solution concentration, mmol/g | | | | Time of impregnation | Weight gain wt % |
|---|---|---|---|---|---|---|---|---|
| | | | Ni | Cu | Mg | Ce | | |
| 61880-20-1 | Ni/TiO2 | 5 | 2.66 | | | | 1 | 14 |
| 61880-25-1 | Ni/TiO2 | 5 | 2.66 | | | | 2 | 17 |
| 61880-25-2 | NiCu/TiO2 | 5:1 | 2.27 | 0.47 | | | 2 | 19 |
| 61880-34 | NiCuCe/TiO2 | 5:1:5 | 0.97 | 0.194 | | 0.96 | 2 | 19 |
| 61880-25-3 | NiCuMgCe/TiO2 | 5:1:1.75:1 | 1.31 | 0.26 | 0.25 | 0.45 | 4 | 26 |

With the above success, impregnating TiO2 monoliths was tried with more complex solutions. Different from the above procedure, the impregnation was conducted with hot solution and monolith to increase the catalyst loading. One impregnation solution was prepared by mixing the Ni(NO3)2.6H2O, Cu(NO3)2.2.5H2O, Mg(NO3)2.6H2O, Ce(NO3)3.6H2O, and Al(NO3)3.9H2O salts with an atomic ratio of Ni:Cu:Mg:Ce:Al=1:0.2:0.1:1:2. The weight concentration is shown in table 12. A minimal amount of water was added into the salt mixture, heated, and stirred at 60° C. until complete dissolution. A clear, green solution was obtained and denoted Sol 61880-72. Another solution was prepared by adding KNO3 salt in the above mixture with an atomic ratio of K/M (M=Ni+Cu+Mg+Ce+Al)=0.08, which is denoted as Sol 61880-72-K.

TABLE 12

Solution concentrations used for impregnating NiCuMgCeA composite catalyst

| Solution # | Ni(NO3)2•6H2O | Cu(NO3)2•2.5H2O | Mg(NO3)2•6H2O | Ce(NO3)3•6H2O | Al(NO3)3•9H2O | KNO3 |
|---|---|---|---|---|---|---|
| 61880-72 | 18.5% | 3.0% | 1.7% | 28.0% | 48.8% | 0% |
| 61880-72-K | 17.7% | 2.9% | 1.6% | 26.7% | 46.6% | 4.6% |

Bare TiO2 monoliths were placed in 75° C. oven to warm up prior to impregnation. The impregnation was conducted by immersing the warm monolith in the 70° C.-solution and degassing under vacuum for 5-10 min until no major gas bubbles emerged. Then, the monolith was taken out of the solution. The excessive solution inside the channel was drained first and then, removed on a centrifuge at 3000 rpm for 2-5 minutes. The wet monolith was left in the fume hood to dry at room temperature, and dried inside an oven at 120° C. overnight. After drying, two monoliths were impregnated second time with respective solution. All the dried monoliths were calcined in a tubular furnace in air at 500° C. for 6 h. Table 13 lists the four monolith catalyst samples prepared.

TABLE 13

TiO2 monoliths impregnated with NiCuMgCeAl oxide composite catalysts

| Monolith ID | Solution # | Sol density, g/cc | Monolith length, cm | Bare weight, g | # of impregnation | Weight gain after calcination, wt % |
|---|---|---|---|---|---|---|
| 60195-138-1 | 61880-72-K | 1.62 | 5.05 | 6.2899 | 2 | NA |
| 60195-138-2 | 61880-72-K | 1.62 | 5.20 | 6.932 | 1 | 16.6 |
| 60195-138-3 | 61880-72 | 1.58 | 5.19 | 6.5406 | 1 | 18.9 |
| 60195-138-4 | 61880-72 | 1.58 | 5.00 | 6.467 | 2 | 27.8 |

One-time impregnation resulted in the 16.6 and 18.9% catalyst weight gains with the 61880-72-K and 61880-72 solutions, respectively. Upon autopsy, the channels appeared uniform.

The elemental compositions and uniformity of the monolith catalysts were analyzed by SEM/EDS. Two SEM samples were prepared for each of the first three monoliths in Table 13. First sample has clean, fractured channel walls, while second sample has the flat channel wall being exposed. Three spots along the channel wall thickness were analyzed: two close to the wall surface, one in middle of the wall thickness. The elemental compositions of interior channel walls are compared to the exterior channel wall in Table 14. Presence of all the metallic elements inside the channel wall is confirmed. There are some variations in relative metal element loading at different spots at micrometer-scale. But, co-presence of targeted elements throughout the channel wall is confirmed.

TABLE 14

Atomic compositions of the monoliths impregnated with NiCuMgCeAl oxide composite

| No 60195 | Location | Total M to Ti M/Ti | Individual M to Ni K | Ni | Cu | Ce | La | Mg | Al |
|---|---|---|---|---|---|---|---|---|---|
| -138-1 | Thickness left | 0.13 | 1.52 | 1.00 | 0.34 | 2.34 | 0.00 | 0.00 | 4.47 |
|  | Thickness middle | 0.15 | 1.71 | 1.00 | 0.55 | 1.65 | 0.00 | 0.03 | 5.55 |
|  | Thickness right | 0.20 | 2.30 | 1.00 | 0.33 | 1.45 | 0.00 | 0.71 | 8.17 |
|  | Channel surface | 0.19 | 2.84 | 1.00 | 1.32 | 4.74 | 0.00 | 0.73 | 7.25 |
|  | Average | 0.17 | 2.09 | 1.00 | 0.63 | 2.54 | 0.00 | 0.37 | 6.36 |
| 138-2 | Thickness left | 0.15 | 1.49 | 1.00 | 0.08 | 2.16 | 0.00 | 0.00 | 4.00 |
|  | Thickness middle | 0.18 | 1.66 | 1.00 | 0.08 | 1.80 | 0.00 | 0.13 | 5.19 |
|  | Thickness right | 0.20 | 1.83 | 1.00 | 0.21 | 2.25 | 0.00 | 0.28 | 6.03 |
|  | Channel surface | 0.17 | 1.63 | 1.00 | 0.47 | 1.68 | 0.00 | 0.08 | 4.55 |
|  | Average | 0.18 | 1.65 | 1.00 | 0.21 | 1.97 | 0.00 | 0.12 | 4.94 |
| 138-4 | Thickness left | 0.56 | 0.01 | 1.00 | 0.05 | 0.33 | 0.00 | 0.00 | 0.77 |
|  | Thickness middle | 0.86 | 0.00 | 1.00 | 0.26 | 0.17 | 0.00 | 0.14 | 1.47 |
|  | Thickness right | 0.74 | 0.00 | 1.00 | 0.23 | 0.20 | 0.00 | 0.02 | 1.51 |
|  | Channel surface | 0.16 | 0.02 | 1.00 | 0.63 | 1.28 | 0.00 | 0.30 | 3.77 |
|  | Average | 0.58 | 0.01 | 1.00 | 0.29 | 0.49 | 0.00 | 0.12 | 1.88 |
| 138-3 | Thickness left | 0.20 | 0.01 | 1.00 | 0.10 | 1.34 | 0.00 | 0.17 | 1.73 |
|  | Thickness middle | 0.17 | 0.00 | 1.00 | 0.14 | 1.13 | 0.00 | 0.11 | 0.98 |
|  | Thickness right | 0.24 | 0.00 | 1.00 | 0.14 | 1.25 | 0.00 | 0.57 | 2.55 |
|  | Average | 0.20 | 0.01 | 1.00 | 0.13 | 1.24 | 0.00 | 0.28 | 1.75 |

A new group of monolith catalysts listed in Table 15 were prepared using the NiCuMgCeAl solutions and procedures same as used above. With the repeated procedures, the resulting catalysts showed consistent weight gains. First impregnation resulted in catalyst weight gain 13.2-14.5 wt % among six samples. Different from the above trial with NiCuMgCeAl composite solution, second time impregnation was conducted on the calcined monolith rather than the dried. The second impregnation resulted in final catalyst weight gain of 25.5-30.0 wt % among the four samples.

TABLE 15

TiO2 monoliths impregnated with NiCuCeMgLaAl oxide composite catalysts

| Monolith | | Monolith support | | First impregnation weight gain, wt % | | Second impregnation weight gain, wt % | | Final weight |
|---|---|---|---|---|---|---|---|---|
| ID 60195- | Solution ID | Length, cm | Weight, g | After drying | After calcination | After drying | After calcination | gain wt % |
| 145-1 | 61880-72-K | 15.2 | 20.3503 | 42.5 | 13.9 | 30.3 | 10.2 | 25.5 |
| 145-2 | 61880-72-K | 13.9 | 19.4530 | 45.9 | 14.5 | 32.7 | 13.8 | 30.3 |
| 145-3 | 61880-72-K | 11.3 | 17.0141 | 46.2 | 14.3 | NA | NA | 14.3 |
| 145-4 | 61880-72 | 10.8 | 15.6685 | 42.2 | 13.4 | NA | NA | 13.4 |
| 145-5 | 61880-72 | 9.6 | 14.4469 | 42.2 | 13.2 | 37.6 | 13.9 | 29.0 |
| 145-6 | 61880-72 | 9.4 | 13.8092 | 45.9 | 14.0 | 30.7 | 11.0 | 26.5 |

Preparation of the monolith catalyst by coating was tried with coating slurry made of NiCuMgCeAl—O composite particle, which was prepared using the previous particle preparation procedure. The coating slurry was introduced into the bare TiO2 monolith channel and drained. The excessive solution was further removed from the channel by centrifugation. Resulting coating looked uniform for the three samples. The coated samples were dried in fume hood overnight and then, dried in an oven at 120° C. for 5 days. The dried monolith was calcined at 500° C. for 6 h in air in a tubular furnace. Table 16 lists the weight gains. The catalyst loading was only a few percentage, which is fairly low. More problematically, the coating layer did not have any adhesion on the channel wall, and existed as a loose layer. This example shows that impregnation is a more effective method to load the metal oxide composite catalyst into monoliths.

TABLE 16

TiO2 monoliths coated with NiCuMgCeAl—O composite oxide slurry

| Monolith ID | Bare mass (g) | Weight gain afer drying wt % | Weight gain afer calcination wt % |
|---|---|---|---|
| 60195-140-1 | 7.2531 | 7.4 | 4.4 |
| 60195-140-2 | 6.7767 | 4.5 | 2.3 |
| 60195-140-3 | 6.5095 | 5.6 | 3.2 |

Example IX. Steam Reforming Reaction Testing of Bio-Oils in a Particle-Packed Bed Bio-oil feed used in this testing was an oak pyrolysis oil (TCPDU) received from NREL on Oct. 29, 2010. The oil remains fluidic at room temperature but was very viscous. Its composition was reported as 44.94% C, 7.29% H, 47.66% 0, 0.01% S, and <0.05% ash. The molecular formula is $CH_{1.95}O_{0.80}$.

2.0 g of catalyst particles were packed into a ½" reactor tube with a bed packing height about 3.2 cm. The catalyst names and testing results of five reactor runs are summarized in Table 17. NiCu—MgCe—Al oxide composite was prepared in the catalyst particle form (Cat ID 61880-35 in Table 10). NiCuCe/TiO2 (as-received), Ni/TiO2 (700° C.-calcined), and Ni/TiO2 ($H_2O$-washed and 700° C.-calcined) were prepared in the monolith form (Cat #61880-34, 61880-25-1 in Table 11). The Ni/TiO2 (700° C.-calcined) and Ni/TiO2 ($H_2O$-washed and 700° C.-calcined) were prepared using the same procedure as Ni/TiO2 (61880-25-1 in Table 11) except for using of different TiO2 monolith. The 700° C.-calcined and H2O-washed monolith supports were used to remove potential harmful components in the as-received monolith. The monolith was crushed and sieved into 20-100 mesh, same sizes as the catalyst particle.

For first two runs, top of the catalyst bed was packaged with a layer of quartz wool and a monolith spacer. In $3^{rd}$ run, the monolith spacer was removed. In runs 4 and 5, nothing was packed on top of the catalyst bed. The reactor was heated to a mid-bed temperature of 400° C. Steam was introduced first and followed with bio-oil delivered by a syringe pump. The reactor effluent was cooled, and the steam and oil were condensed into a gas/liquid separator. The off-gas flow rate was measured by a flow meter and the gas composition was analyzed by a Mass Spec using argon as an internal standard. The gas production rate is calculated based on the off-gas flow rate and composition. All the runs were conducted near atmospheric pressure at GHSV=100,000. After the reaction was held for 10 to 40 min, the reactor was heated to either 450° C. or 500° C. Since the gas production varied with time, initial gas production rates are used for comparison of different reactor runs in Table 17.

Compared to the TiO2 monolith-supported catalysts, the NiCu—MgCe—Al oxide composite catalyst showed a significant reforming activity at 400° C. Thus, this catalyst formulation was used to prepare monolith catalysts.

Example X. Elemental Compositions of Metal Oxide Composite Catalyst

The NiCu—MgCe—Al oxide composite catalyst before and after the bio-oil reforming test was analyzed by SEM. The elemental compositions are listed in Table 18. The microstructures and EDS analytical spots are shown in FIG. 25. Even for the catalyst particle, there is significant variation in the elemental composition at different spots of a catalyst particle at micrometer scale. Co-existence of the metal elements in all the spots is confirmed. The composite catalyst of present invention is characterized by co-existence of these different metal elements at the same spot at micrometer scale.

TABLE 18

Elemental compositions of NiCu—MgCe—Al oxide composite catalyst particle

|  | Ni | Cu | Ce | Mg | La | Al | Na |
|---|---|---|---|---|---|---|---|
| Fresh |  |  |  |  |  |  |  |
| Spot 1 | 1.00 | 0.35 | 0.15 | 0.57 | 0.00 | 2.02 | 0.00 |
| Spot 2 | 1.00 | 0.36 | 0.10 | 0.43 | 0.00 | 1.61 | 0.00 |
| Spot 3 | 1.00 | 3.20 | 0.99 | 0.38 | 0.01 | 21.37 | 0.00 |
| Spot 4 | 1.00 | 0.31 | 0.07 | 0.48 | 0.00 | 1.76 | 0.00 |
| Avg | 1.00 | 0.46 | 0.14 | 0.48 | 0.00 | 2.60 | 0.00 |
| STDEV | 0.00 | 1.43 | 0.44 | 0.08 | 0.00 | 9.79 | 0.00 |
| Spent |  |  |  |  |  |  |  |
| Spot 1 | 1.00 | 0.38 | 0.29 | 0.68 | 0.01 | 2.79 | 0.11 |
| Spot 2 | 1.00 | 0.33 | 0.12 | 0.48 | 0.00 | 2.19 | 0.06 |
| Spot 3 | 1.00 | 0.43 | 0.27 | 0.61 | 0.01 | 2.65 | 0.00 |
| Spot 4 | 1.00 | 0.46 | 0.63 | 0.90 | 0.01 | 2.73 | 0.01 |
| Avg | 1.00 | 0.40 | 0.32 | 0.66 | 0.01 | 2.57 | 0.09 |
| STDEV | 0.00 | 0.05 | 0.21 | 0.17 | 0.00 | 0.27 | 0.05 |

TABLE 17

Bio-oil steam reforming reaction testing results of particle catalyst beds

| | Run # | | | | |
|---|---|---|---|---|---|
| | 1 | 2 | 3 | 4 | 5 |
| Catalyst | NiCu—MgCe—Al Oxide 61880-35 | NiCuCe/TiO$_2$ (as-received) 61880-34 | Ni/TiO$_2$ (700° C.-calcined) | Ni/TiO$_2$ (H$_2$O-washed and 700° C.-calcined) | NiCu—MgCe—Al Oxide 61880-35 |
| Reactor packing above catalyst | Monolith guide bed/quartz wool | Monolith guide bed/quartz wool | Quartz wool | Free space | Free space |
| Bed temperature | | | | | |
| Top, ° C. | 380  430  475 | 400  465 | 362  385 | 420  490 | 350  395  442 |
| Mid, ° C. | 400  450  510 | 450  500 | 400  410 | 460  520 | 387  440  490 |
| Gas production rate | | | | | |
| H$_2$, sccm | 10  13  22.5 | 3.3  11.8 | 1.5  1.0 | 2.0  7.0 | 74  10  15 |
| CO$_2$, sccm | 12  7.5  11 | 4.4  7.4 | 1.7  1.2 | 1.2  3.2 | 23  6  8 |
| CO, sccm | NA  NA  NA | 4  6 | 2.2  2.5 | 3.6  5.8 | 6  3  5 |

Example XI. Bio-Oil Reforming Testing of Monolithic Reforming Catalyst Module

The $TiO_2$ monolith impregnated with the K—NiCuCeMgAl composite catalyst (Cat 60195-145-3 in table 15) was tested for steam reforming of bio-oil. To mitigate the small flow rate problems with the reacting testing apparatus, ¼" quartz tube of 6.2 mm OD×4.2 mm ID was mounted onto top of the monolith by cement. The monolith module was housed inside a steel reactor tube of 20 mm ID, and steam/bio-oil line was connected to the quartz tube. In this way, the steam/bio-oil feed was directly delivered to the four reaction channels of the monolith module. The as-received bio-oil was a viscous, dark fluid. The bio-oil was pumped into the reactor at room temperature, while water was vaporized to abut 110° C. into steam. The steam combined with the bio-oil flowed downwards into the monolith channel via the quartz tube. The steel reactor tube was heated by a two-stage furnace with the top and bottom bed temperature being monitored and controlled.

Figure 26A:
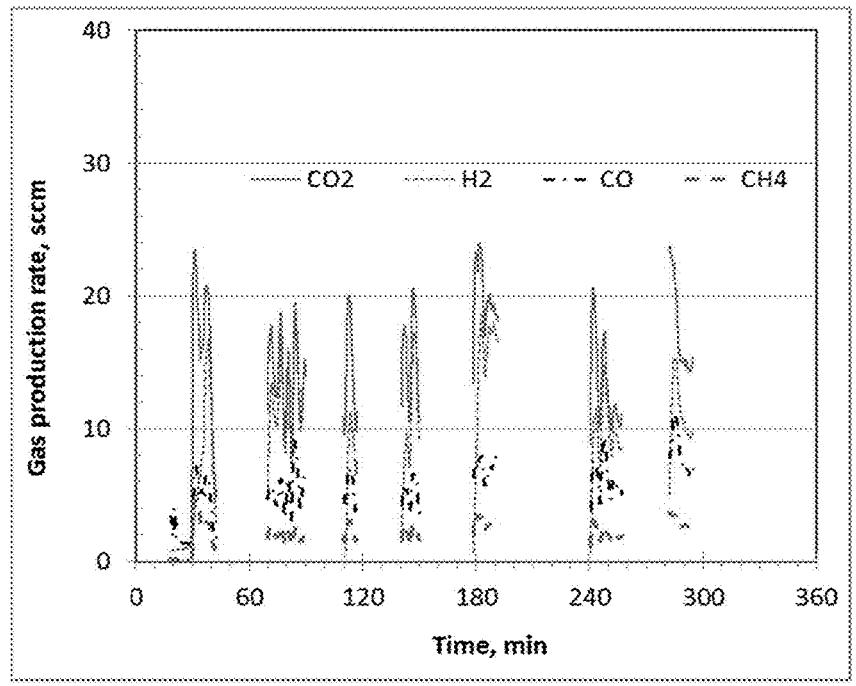
FIGS. 26A-26B show Gas production profiles of bio-oil reforming in four monolith catalyst channels after periodic regeneration in air (reforming conditions: bed temperature=560° C., pressure=5 psig, 0.2 cc/min bio-oil, 0.2 cc/min de-ionized water, 200 sccm Argon purge gas; regeneration conditions: 200 sccm air at the same temperature and pressure). (A) 7 reforming/regeneration cycles in $1^{st}$ day (B) 5 reforming/regeneration cycles in $2^{nd}$ day.
Figure 26B:
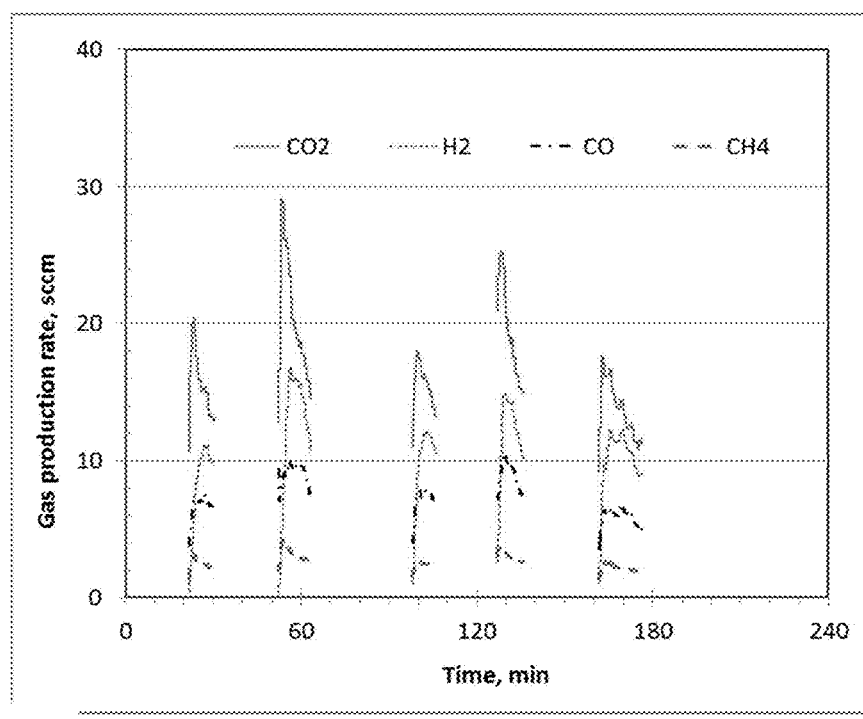

The reactor temperature was raised to about 560° C. in 200 sccm of air. When the reactor temperature stabilized, 200 sccm of Ar purge gas was introduced into the reactor with 0.2 cc/min water and 0.2 cc/min of bio-oil. The reactor pressure was controlled at about 5 psig. The reactor effluent was cooled to about 6° C. The liquid was condensed and collected, while the gas was sampled for composition analysis by Mass Spec. After the steam reforming reaction was carried out about 20 min, the bio-oil and water feeds were stopped and 200 sccm air flow was introduced to conduct the catalyst regeneration. The regeneration was carried out about 20 min. FIG. 26 shows gas production profiles in 12 of consecutive reforming/regeneration cycles. The ability to activate the catalyst by heating in air was confirmed. The effectiveness to conduct bio-oil steam reforming in the monolith catalyst channel is demonstrated.

The liquid products collected from all the reforming runs looked clear. These products are a mixture of water and un-converted (or reformed) bio-oil. A clear solution is very beneficial to re-processing of the remaining hydrocarbon species, and preferred embodiments of the invention can be characterized by the recovery of a clear liquid phase as the primary or only recovered liquid phase and, optionally, recycle of all or part of the liquid phase.

What is claimed is:

1. A reactor for producing hydrogen, comprising:
   a plurality of reaction channels comprising a steam reforming catalyst or water gas shift catalyst, each reaction channel comprising one or more channel walls;
   wherein at least one reaction channel wall is porous to carbon dioxide;
   at least one sorbent chamber adjacent the reaction channel, separated from the reaction channel by one or more channel walls and comprising a CO2 sorbent; and
   wherein the reaction channel comprising the steam reforming catalyst has an average diameter of between 0.1 mm and 10 mm,
   wherein the reactor channels each have an inlet and an outlet, and
   wherein the sorbent chamber(s) have no ports or closed ports configured such that gaseous flow into and out of a sorbent chamber is only through the porous reaction channel wall(s).

2. The reactor of claim 1 wherein the reactor comprises at least 10 parallel reaction channels.

3. The reactor of claim 1 wherein the catalyst is a steam reforming catalyst and wherein the steam reforming catalyst is a wall coating and wherein an open bulk flow path is present in reaction channel.

4. The reactor of claim 3 wherein the steam reforming catalyst comprises Ni, Cu, Mg, Ce, and Al.

5. The reactor of claim 1 wherein the reactor comprises a honeycomb monolith.

6. The reactor of claim 5 comprising a plurality of parallel reaction channels alternating with plurality of parallel sorbent chambers; preferably at least 10 parallel reaction channels alternating with at least 10 parallel sorbent chambers.

7. The reactor of claim 1 wherein sorbent fills a cross-section of the sorbent chamber.

8. The reactor of claim 1 wherein the reactor comprises a honeycomb monolith; and wherein the monolith comprises: a macro- and meso-porous material; a metal oxide; titania, alumina, silica; or a dense material such as metal with apertures for gas flow.

9. The reactor of claim 1 wherein the sorbent surrounds at least one reaction channel.

10. The reactor of claim 1 wherein a single sorbent chamber surrounds the plurality of reaction channels.

11. The reactor of claim 1 wherein the porous channel wall has a volume average pore size that in the range of about 1 nm to 100 µm.

12. A method of steam reforming, comprising passing hydrocarbon and steam into the reactor of claim 1.

13. A method of converting hydrocarbons to H2, comprising
   passing a carbon fuel and water into the reactor of claim 1;
   wherein the water is in the form of steam or wherein the water is converted to steam within the reactor;
   wherein the reaction channel is at a temperature of at least 350 °C.;
   wherein the steam and carbon fuel react in the reaction channel at a temperature of at least 350 °C. to produce at least $H_2$ and $CO_2$;
   wherein at least a portion of the $CO_2$ flows into the sorbent chamber where it is sorbed by the $CO_2$ sorbent; and
   regenerating the $CO_2$ sorbent.

14. The method of claim 13 wherein the carbon fuel is a hydrocarbon and wherein the reactor comprises a steam reforming catalyst.

15. The method of claim 14 wherein the reforming and sorption are performed at a temperature less than or equal to about 700° C., in some embodiments less than or equal to about 550° C. in a time of less than about 10 minutes.

16. The method of claim 14 wherein the reforming and sorption are performed iteratively in a plurality of cycles with a delay between any subsequent cycle of less than or equal to about 10 minutes.

17. The method of claim 14 wherein the hydrocarbon feedstock is a bio-oil.

* * * * *